United States Patent
Fukasawa

(10) Patent No.: US 9,069,724 B2
(45) Date of Patent: Jun. 30, 2015

(54) IMAGING FORMING APPARATUS WITH AUTOMATIC CONFIGURATION UPDATE

(71) Applicant: CANON KABUSHIKI KAISHA, Tokyo (JP)

(72) Inventor: Nobuaki Fukasawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 382 days.

(21) Appl. No.: 13/690,243

(22) Filed: Nov. 30, 2012

(65) Prior Publication Data

US 2013/0151678 A1    Jun. 13, 2013

(30) Foreign Application Priority Data

Dec. 12, 2011   (JP) .................. 2011-271020

(51) Int. Cl.
*G06F 15/177* (2006.01)
*H04L 12/24* (2006.01)
*G06F 3/12* (2006.01)
*H04L 29/12* (2006.01)

(52) U.S. Cl.
CPC ........... *G06F 15/177* (2013.01); *H04L 41/0809* (2013.01); *G06F 3/1229* (2013.01); *H04L 41/0846* (2013.01); *H04L 61/6022* (2013.01)

(58) Field of Classification Search
CPC  H04L 41/0803–41/082; G06F 3/1229–3/1236
USPC .......................................... 709/221
See application file for complete search history.

(56) References Cited

U.S. PATENT DOCUMENTS

| | | | |
|---|---|---|---|
| 6,795,835 B2* | 9/2004 | Ricart et al. ........................ 1/1 |
| 8,326,939 B2* | 12/2012 | Ueno et al. ..................... 709/213 |
| 8,751,533 B1* | 6/2014 | Dhavale et al. ............... 707/782 |
| 2006/0265431 A1* | 11/2006 | Yamato et al. ................ 707/201 |
| 2012/0257603 A1* | 10/2012 | Mercier ....................... 370/338 |
| 2012/0317253 A1* | 12/2012 | Maekawa ..................... 709/221 |
| 2012/0320415 A1* | 12/2012 | Nakamura ................... 358/1.15 |
| 2014/0317159 A1* | 10/2014 | Dhavale et al. .............. 707/823 |

FOREIGN PATENT DOCUMENTS

| | | |
|---|---|---|
| JP | 2005-339106 A | 12/2005 |
| JP | 2007-130838 A | 5/2007 |

* cited by examiner

*Primary Examiner* — Shirley Zhang
(74) *Attorney, Agent, or Firm* — Carter, DeLuca, Farrell & Schmidt, LLP

(57) ABSTRACT

A set value management service receives a replace request for replacing configuration data of a first image forming apparatus, and searches the second image forming apparatus needs to update configuration data as a result of replacement of the first image forming apparatus. The set value management service updates configuration data of the searched second image forming apparatus.

7 Claims, 22 Drawing Sheets

FIG. 7A

| Set value identifier 402 | Default value 403 | Value range 404 | Condition 405 |
|---|---|---|---|
| copy_settings.nup | 1in1 | 1 in 1, 2 in 1, 4 in 1 | None |
| device_settings.cloud_address | http://ddd.com/config | 256 bytes | None |
| device_settings.sleep_time | 10 minutes | 1 minute, 10 minutes, 1 hour | None |
| fax_settings.received_print | OFF | ON, OFF | Facsimile unit |
| box_settings.server_address | "" | 256 bytes | None |

FIG. 7B

| Set value identifier 402 | Default value 403 | Value range 404 | Condition 405 |
|---|---|---|---|
| copy_settings.nup | 1in1 | 1 in 1, 2 in 1, 4 in 1 | None |
| device_settings.cloud_address | http://ddd.com/config | 256 bytes | None |
| device_settings.sleep_time | 10 minutes | 1 minute, 10 minutes, 1 hour | None |
| fax_settings.received_print | OFF | ON,OFF | Facsimile unit |

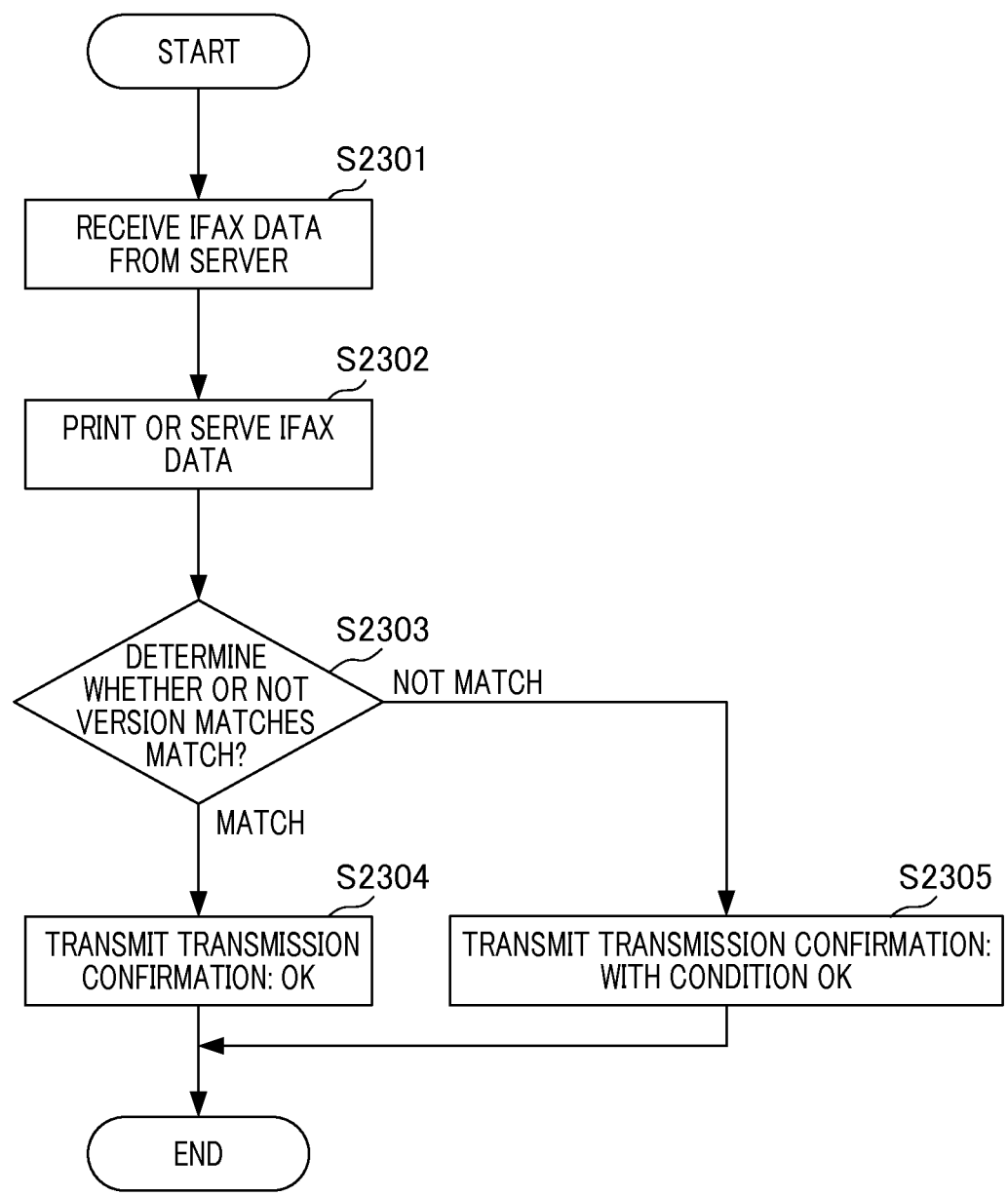

FIG. 24A

IFAX transmission history

```
————— 2411     OK
————— 2412     OK?
               OK
               OK
————— 2413     NG
```

[Detail information] — 2418

IFAX transmission history

Address:
  DddKosugiOffice<kkkkkk@ddd.co.jp.>
Transmitted date and time:
  2011/08/01
Transmission confirmation:
  OK
Note:
  Normal reception by reception destination has been confirmed.

IFAX transmission history  detail information

Address:
  DddTorideOffice<tttttt@ddd.co.jp.>
Transmitted date and time:
  2011/08/01
Transmission confirmation:
  OK
Note:
  Normal reception by reception destination has been confirmed but transmission by using information of old address book has been detected. You might get better result by transmitting with another condition.

[OK] — 2431

2430

IMAGING FORMING APPARATUS WITH AUTOMATIC CONFIGURATION UPDATE

BACKGROUND OF THE INVENTION

The present invention relates to an information processing system a management method and a storage medium.

DESCRIPTION OF THE RELATED ART

There has been proposed an image forming apparatus that stores configuration data in a storage unit. The configuration data is setting information (operation setting information) for switching the operation of the image forming apparatus. Since configuration data is stored in the storage unit provided in each of the image forming apparatuses, the setting changes in configuration data need to be made by the number of image forming apparatuses in order to change configuration data for all of the image forming apparatuses.

For saving the time for changing the settings of configuration data by the number of image forming apparatuses, there has been proposed a technology in which the settings of configuration data for a plurality of image forming apparatuses are made at one time by a certain information processing apparatus. For example, Japanese Patent Laid-Open No. 2007-130838 discloses an image forming system in which a plurality of image forming apparatuses, to which the initial setting operation has been performed, downloads initial system setting information from a server and reflects the downloaded initial system setting information on the initial setting content.

Also, it is assumed that configuration data is handed over when the image forming apparatus is replaced. Here, there may be a case in which configuration data corresponding to other image forming apparatuses needs to be changed accompanied with replacement of the image forming apparatus. For example, a case is assumed that the image forming apparatus has a function that performs reception permission/not-permission of a reception packet using a MAC address. Certain image forming apparatus is set such that the image forming apparatus registers the MAC address of other image forming apparatuses in the MAC filter so as to receive only the reception packet from the registered MAC address. When the image forming apparatus of which the MAC address is registered in the MAC filter is replaced, the MAC address is changed, and thus a setting value of the MAC filter retained by other the image forming apparatuses also need to be changed.

Also, a case is assumed that the image forming apparatus has an address book used for transmitting to other image forming apparatus connected to a network. A transmission destination of the image forming apparatus is registered in this address book. When the image forming apparatus registered as the transmission destination in the address book, the address book retained by other image forming apparatuses needs to be replaced. Conventionally, a manager himself has changed configuration data corresponding to other image forming apparatuses one by one accompanied with replacement of the image forming apparatus.

Japanese Patent Laid-Open No. 2005-339106 discloses a printer address monitoring system in which a monitor tool detects a change of an IP address of a printer to be monitored so as to notify the change to a client computer.

The conventional technology which the manager should change configuration data corresponding to other image forming apparatuses one by one imposes great burden on the manager when configuration data corresponding to other image forming apparatuses needs to be changed accompanied with replacement of the image forming apparatus.

When the printer address monitoring system disclosed in Japanese Patent Laid-Open No. 2005-339106, processing load is increased since the monitor tool needs to constantly monitor the printer to be monitored. Thus, the monitoring system disclosed in Japanese Patent Laid-Open No. 2005-339106 is applied to update processing of configuration data, following case may be occurred. In other words, in this system, the other image forming apparatus that needs to change configuration data cannot be searched without exceed processing load, nor configuration data of the searched image forming apparatus can automatically updated when the image forming apparatus is replaced.

SUMMARY OF THE INVENTION

The information processing system of the present invention searches other image forming apparatus required for changing configuration data without excessive load processing, and automatically changes configuration data of the searched image forming apparatus when the image forming apparatus is replaced.

The information processing system of the present embodiment includes an image forming apparatus, a management device that manages operation setting information that switches an operation of the image forming apparatus. The management device includes; a holding unit configured to hold the operation setting information of the image forming apparatus; a request receiving unit configured to receive a replace request for replacing operation setting information of a first image forming apparatus from the first image forming apparatus that has been replaced; a searching unit configured to search a second image forming apparatus that needs to update operation setting information as a result of replacement of the first image forming apparatus when the replace request is received; and an updating unit configured to update the operation setting information of the searched second image forming apparatus. The first image forming apparatus includes a replace requesting unit configured to transmit the replace request for replacing own operation setting information via the network when the first image forming apparatus is replaced.

Further features of the present invention will become apparent from the following description of exemplary embodiments (with reference to the attached drawings).

BRIEF DESCRIPTION OF THE DRAWINGS

FIGS. 7A and 7B are diagrams illustrating an exemplary model-specific set value schema.

FIG. 23 is a diagram describing an example of IFAX reception processing executed by the image forming apparatus.

FIG. 24A to FIG. 24C are examples of an operation panel provided in the image forming apparatus that transmits IFAX data.

DESCRIPTION OF THE EMBODIMENTS

Hereinafter, a description will be given of the information processing system of the present embodiment. Firstly, the terms used in the present embodiment are defined. The term "configuration data" refers to data (operation setting information) for switching the operation of an image forming apparatus. For example, configuration data corresponds to a default value for imposition of a copy job or the like. If the default value for imposition of a copy job is set to "1 in 1", one page is printed on a single sheet of paper as a result of copying. If the default value for imposition of a copy job is set to "2 in 1", two pages are printed on a single sheet of paper as a result of copying.

The term "device configuration data" refers to data indicating the configuration of a device provided in an image forming apparatus. For example, device configuration data indicates whether or not an image forming apparatus includes a facsimile unit. Examples of device configuration data include a model code for uniquely identifying the model of an image forming apparatus, a running firmware version, and the like.

The term "model-specific set value schema" refers to data for defining the schema of configuration data that is held by a specific model of an image forming apparatus. The term "schema" refers to data for defining the convention and positioning for configuration data. Examples of such a model-specific set value schema include a condition(s) for validating the set value identifier for each configuration data, the default value, the value range, and data. In the present embodiment, it is assumed that there is a difference between configuration data to be held depending on the model of an image forming apparatus and a set value schema is prepared for different models of an image forming apparatus.

Figure 1:
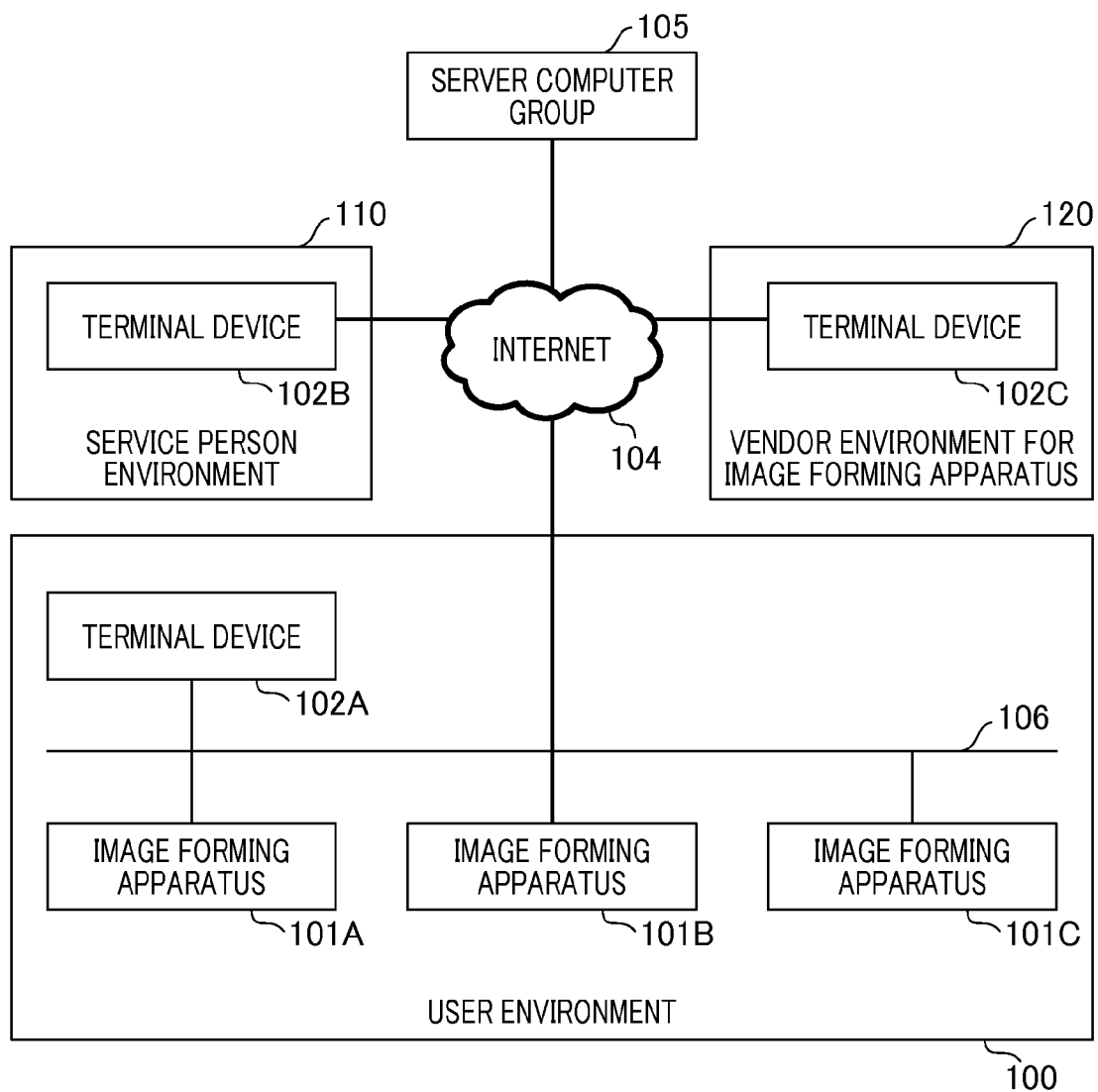
FIG. 1 is a diagram illustrating an exemplary general configuration of the present embodiment.

The term "virtual device" refers to a data group of actual devices held by a server computer group. More specifically, a virtual device includes at least device configuration data and configuration data. The term "tenant" refers to a unit of consignor to whom a user consigns the management of an image forming apparatus. In other words, a tenant is a management range of a user. The term "tenant identifier" refers to an identifier for uniquely identifying a tenant. For example, assume the case where management of image forming apparatuses 101A, 101B, and 101C in a user environment 100 (to be described below) shown in FIG. 1 is consigned by a certain company. In this case, a corresponding tenant identifier is assigned to the user environment 100 and the image forming apparatuses 101A, 101B, and 101C are recognized and managed as the image forming apparatuses belonging to the tenant.

The definition is given as follows so as to distinguish among data included in a virtual device, data held by an actual device, and data dedicated for a tenant. Device configuration data included in a virtual device is referred to as "virtual device configuration data" and configuration data included in a virtual device is referred to as "virtual configuration data". Device configuration data held by an actual device is referred to as "actual device configuration data" and configuration data held by an actual device is referred to as "actual configuration data". Configuration data that is commonly used by image forming apparatuses in a tenant is referred to as "tenant configuration data". Also, configuration data that is commonly used by image forming apparatuses belonging to the external tenant is referred to as "external tenant configuration data".

FIG. 1 is a diagram illustrating an exemplary general configuration of the present embodiment. The information processing system shown in FIG. 1 includes a user environment 100, a server computer group 105, a service person environment 110, and a vendor environment 120 for image forming apparatuses. The user environment 100, the server computer group 105, the service person environment 110, and the vendor environment 120 for image forming apparatuses communicate with each other via Internet 104. The Internet 104 is a network that is capable of providing digital communication on a public line.

The user environment 100 is an environment where a user of an image forming apparatus executes the operation of the image forming apparatus. The user environment 100 includes image forming apparatuses 101A, 101B, and 101C and a terminal apparatus 102A. The image forming apparatuses 101A, 101B, and 101C are the image forming apparatuses of the present embodiment. A network 106 is a network that is capable of providing digital communication in the user environment 100. The image forming apparatuses 101A, 101B, and 101C can access the Internet 104 via the network 106. The terminal apparatus 102A is a computer that is operable by a user of the user environment 100. The terminal apparatus 102A can also access the Internet 104 via the network 106.

The service person environment 110 is an environment where a service person manages an image forming apparatus using the terminal apparatus 102B. The service person environment 110 includes a terminal apparatus 102B. The terminal apparatus 102B is a computer that is operated by a service person who manages the image forming apparatuses 101A, 101B, and 101C. The terminal apparatus 102B can access the Internet 104.

The vendor environment 120 for image forming apparatuses is an environment where management personnel of a vendor for producing an image forming apparatus perform the maintenance of data which is required for the management of an image forming apparatus. The vendor environment 120 for image forming apparatuses includes a terminal apparatus 102C. The terminal apparatus 102C is a computer that is operated by management personnel of a vendor for producing an image forming apparatus. The terminal apparatus 102C can access the Internet 104.

The server computer group 105 is a server group that provides a set value management service 310 (see FIG. 3) for managing configuration data for image forming apparatuses. The server computer group 105 provides a service to a plurality of tenants via the Internet 104. In the present embodiment, the set value management service 310 provided by the server computer group 105 functions as a management apparatus that manages configuration data for image forming apparatuses. The set value management service 310 manages image forming apparatuses by associating them with tenants that are a preset management range. In other words, the set value management service 310 manages the image forming apparatuses for each management range. In the following description, the image forming apparatuses 101A, 101B, and 101C are also described as the image forming apparatus 101 and the terminal apparatuses 102B and 102C are also described as the terminal apparatus 102.

Figure 2:
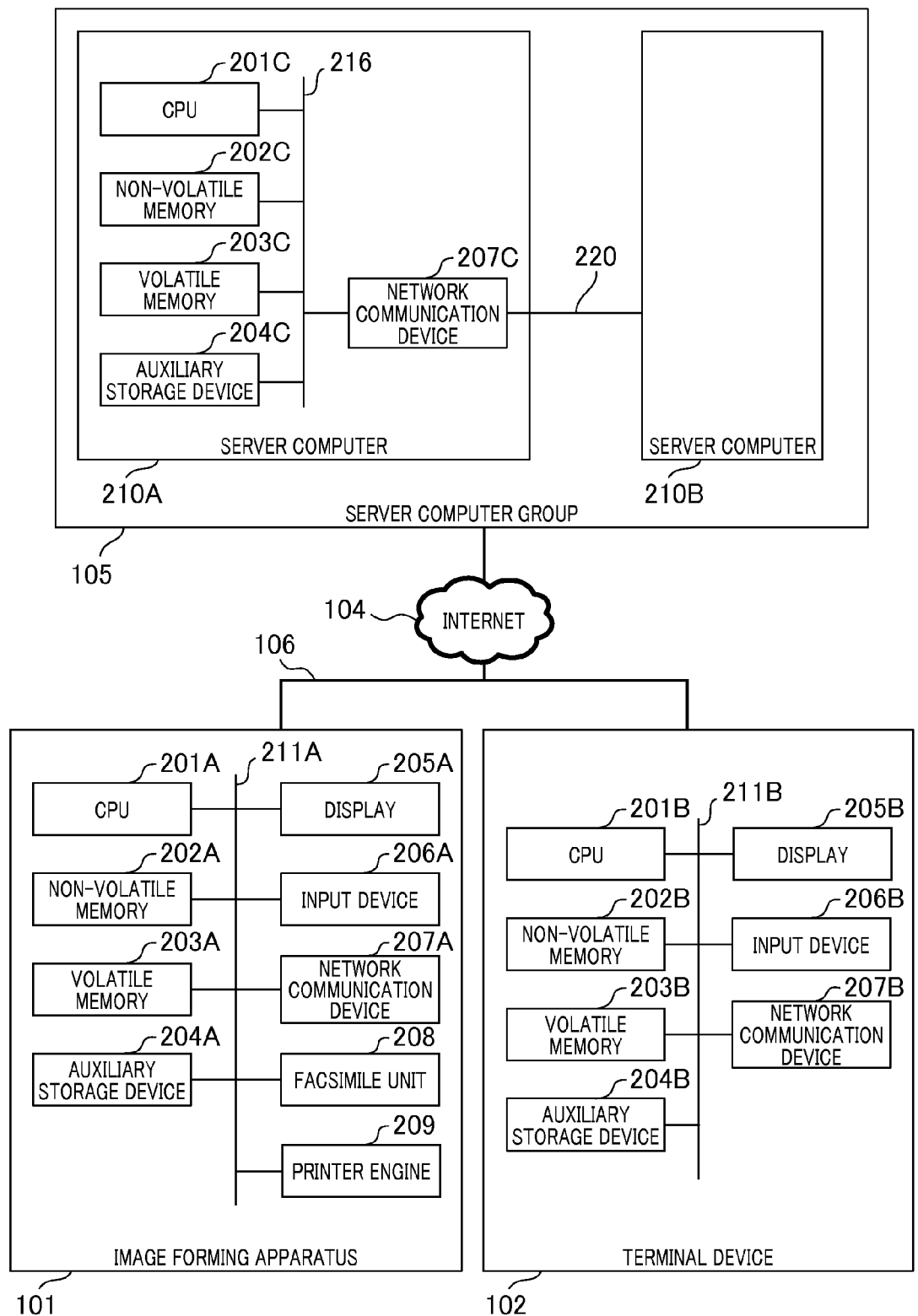
FIG. 2 is a diagram illustrating an example of the hardware configuration of an information processing system.

FIG. 2 is a diagram illustrating an example of the hardware configuration of the information processing system of the present embodiment. The server computer group 105 includes a server computer 210A and a server computer 210B. The server computer 210B has the same configuration as that of the server computer 210A. The server computer 210A and the server computer 210B communicate with each other via a network 220.

The server computer 210A includes a CPU 201C, a non-volatile memory 202C, a volatile memory 203C, an auxiliary storage device 204C, and a network communication device 207C that are connected to an internal bus 216. The image forming apparatus 101 includes a CPU 201A, a non-volatile memory 202A, a volatile memory 203A, an auxiliary storage device 204A, a display 205A, an input device 206A, a network communication device 207A, a facsimile unit 208, and a printer engine 209 that are connected to an internal bus 211A. The terminal apparatus 102 includes a CPU 201B, a non-volatile memory 202B, a volatile memory 203B, an auxiliary storage device 204B, a display 205B, an input device 206B, and a network communication device 207B that are connected to an internal bus 211B.

In the following description, the CPU 201A, 201B, and 201C are also described as a CPU 201, the non-volatile memories 202A, 202B, and 202C are also described as a non-volatile memory 202, the volatile memories 203A, 203B, and 203C are also described as a volatile memory 203, the auxiliary storage devices 204A, 204B, and 204C are also described as an auxiliary storage device 204, the displays 205A and 205B are also described as a display 205, the input devices 206A and 206B are also described as an input device 206, the network communication devices 207A and 207B are also described as a network communication device 207, and the internal buses 211A and 211B are also described as an internal bus 211.

The CPU (Central Processing Unit) 201 executes programs and controls various types of processing. The non-volatile memory 202 includes a ROM (Read Only Memory). The non-volatile memory 202 stores programs and data that is required for device start processing at the initial stage. The volatile memory 203 includes a RAM (Random access Memory). The volatile memory 203 is used as a temporary storage location of the programs and data.

The auxiliary storage device 204 is a large-capacity storage device such as a hard disk, a RAM drive, or the like. The auxiliary storage device 204 stores large-capacity data and holds the execution code of the programs. The auxiliary storage device 204 stores data which needs to be held for a longer time than that of the volatile memory 203. The display 205 performs information display processing and notifies a user person of the resulting information. In the present embodiment, a user person denotes a user and a service person.

The input device 206 accepts a user person's selection instruction and transmits the instruction to a program via the internal bus 211. The network communication device 207 is a device that communicates with an external device via a network. The facsimile unit 208 is a hardware unit that transmits the image data formed by the image forming apparatus 101 or the image data stored in the auxiliary storage device 204A to an external device via the network 106. The facsimile unit 208 is optional and the image forming apparatus 101 may not include the facsimile unit 208. The printer engine 209 prints the image data formed by the image forming apparatus 101 or the image data stored in the auxiliary storage device 204A on a recording medium such as paper.

Figure 3:
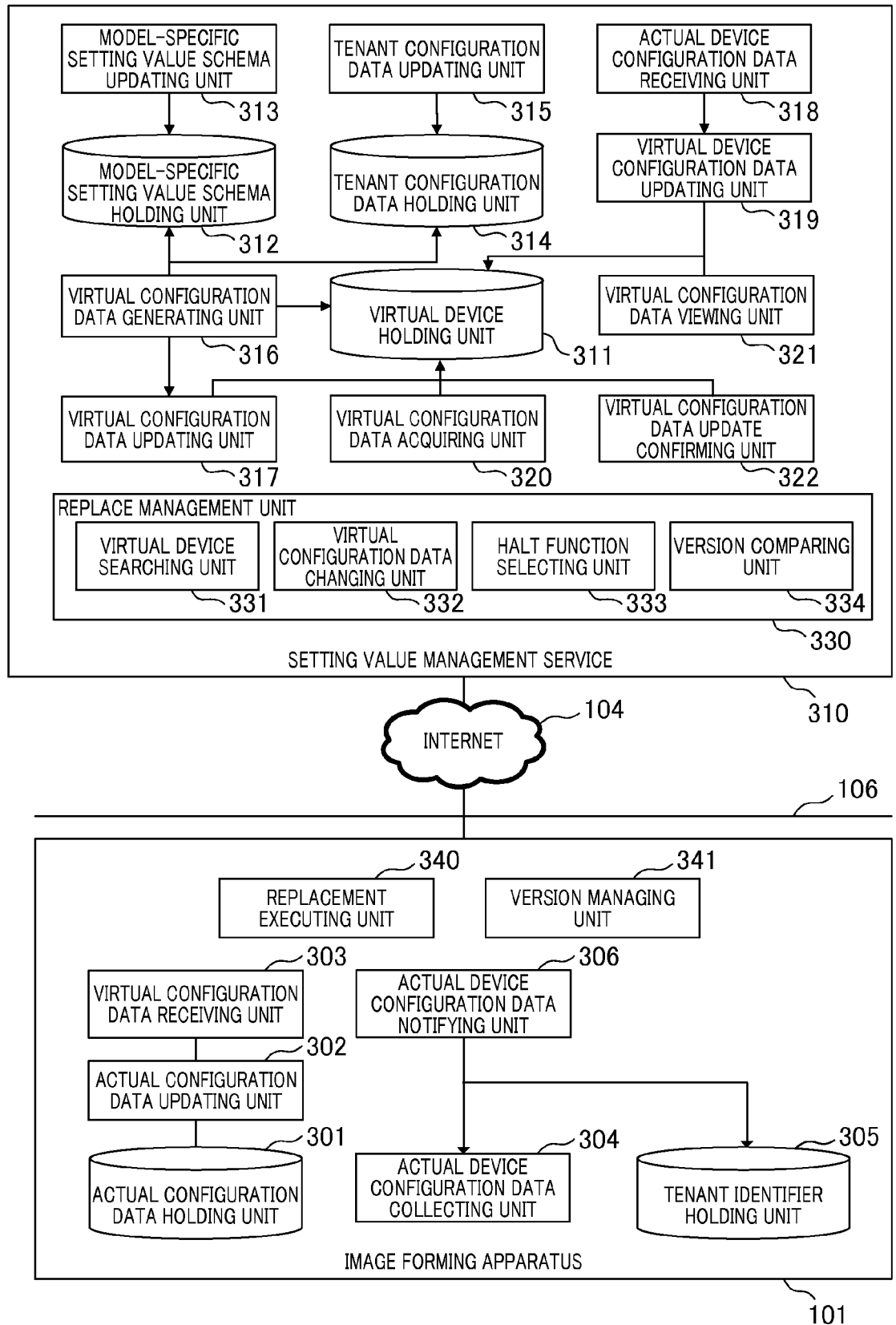
FIG. 3 is an exemplary functional block diagram illustrating the information processing system.

FIG. 3 is an exemplary functional block diagram illustrating the information processing system of the present embodiment. The information processing system shown in FIG. 3 includes an image forming apparatus 101 and a set value management service 310. The image forming apparatus 101 and the set value management service 310 communicate with each other via the Internet 104. The management method of the present embodiment is realized by the functions provided in the information processing system shown in FIG. 3. A program of the present embodiment causes the computer to execute this management method.

The image forming apparatus 101 includes an actual configuration data holding unit 301, an actual configuration data updating unit 302, a virtual configuration data receiving unit 303, an actual device configuration data collecting unit 304, and a tenant identifier holding unit 305. Also, the image forming apparatus 101 includes an actual device configuration data notifying unit 306, a replacement executing unit 340, a version managing unit.

The actual configuration data holding unit 301 holds configuration data for an image forming apparatus. More specifically, the actual configuration data holding unit 301 stores configuration data in the auxiliary storage device 204A for management. The image forming apparatus switches an operational behavior based on actual configuration data held by the actual configuration data holding unit 301.

The actual configuration data updating unit 302 updates actual configuration data held by the actual configuration data holding unit 301. More specifically, the actual configuration data updating unit 302 updates actual configuration data by replacing it with virtual configuration data acquired by the virtual configuration data receiving unit 303. The actual configuration data is applied to the image forming apparatus 101. In other words, the actual configuration data updating unit 302 functions as an applying unit that applies the virtual configuration data acquired by the virtual configuration data receiving unit 303 to the image forming apparatus 101.

The virtual configuration data receiving unit 303 acquires virtual configuration data from the virtual configuration data acquiring unit 320 provided in the set value management service 310. The virtual configuration data receiving unit 303 calls the virtual configuration data acquiring unit 320 using an address which is set in the actual configuration data held by the actual configuration data holding unit 301.

Figure 4A:
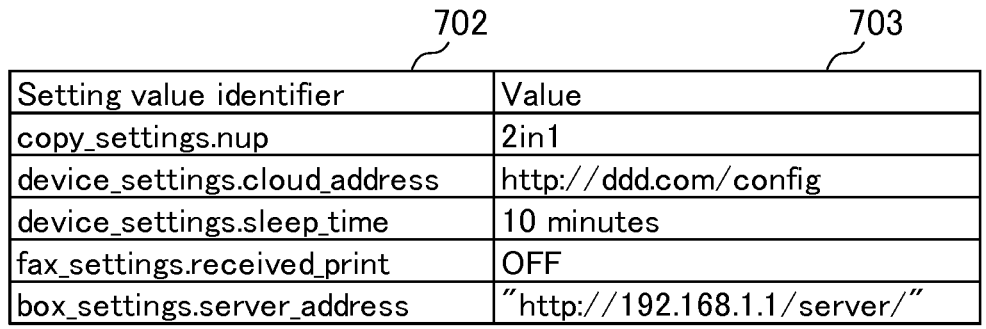
FIGS. 4A to 4C are diagrams illustrating an example of actual configuration data.
Figure 4B:
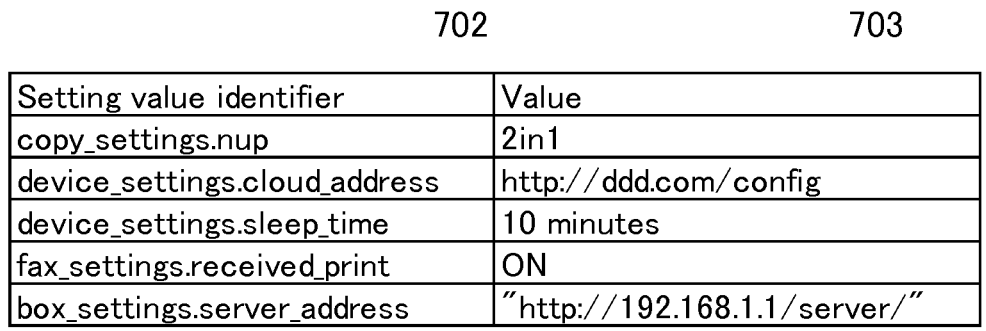
Figure 4C:
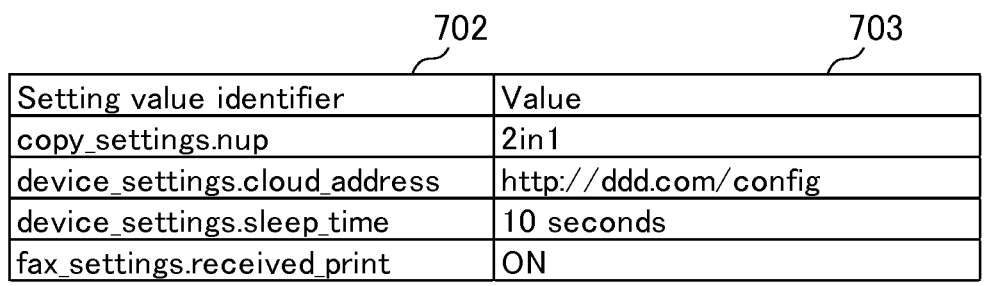

FIGS. 4A to 4C are diagrams illustrating an example of actual configuration data. FIG. 4A shows actual configuration data for an image forming apparatus of which the device identifier is "010001". FIG. 4B shows actual configuration data for an image forming apparatus of which the device identifier is "010002". FIG. 4C shows actual configuration data for an image forming apparatus of which the device identifier is "020001". The device identifier is identification information for uniquely identifying an image forming apparatus.

Actual configuration data has data items including a set value identifier 702 and a value 703. The set value identifier 702 is an identifier for uniquely identifying a setting item. The value 703 is a value of a setting item. In the example shown in FIG. 4, http://ddd.com/config is set as the value (address) of "device_settings.cloud_address". The address is an address for a set value management service which is set as the set value management service for distributing configuration data to the image forming apparatus 101. Thus, the virtual configuration data receiving unit 303 described above accesses the address.

Note that virtual configuration data has the same data configuration as the actual configuration data shown in FIG. 4. Thus, a description will be given of the actual configuration data shown in FIG. 4 as virtual configuration data as appropriate.

Referring back to FIG. 3, the actual device configuration data collecting unit 304 collects device configuration data (actual device configuration data) of the image forming apparatus 101.

Figure 5A:
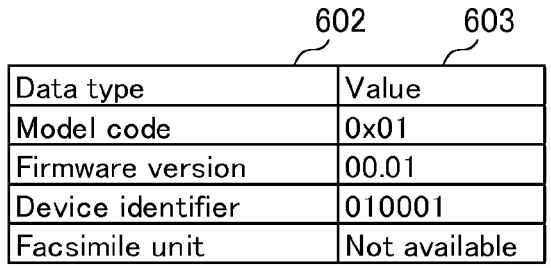
FIGS. 5A to 5C are diagrams illustrating an example of actual device configuration data.
Figure 5B:
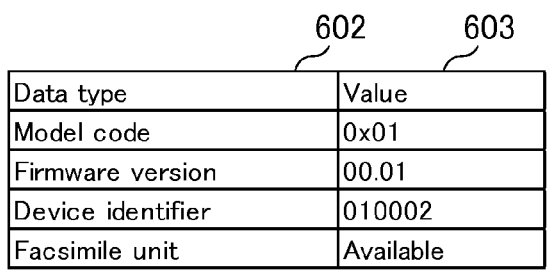
Figure 5C:
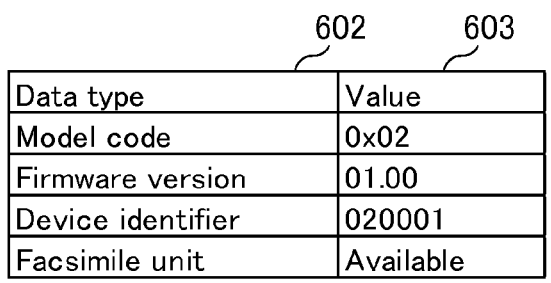

FIGS. 5A to 5C are diagrams illustrating an example of actual device configuration data. Each of FIGS. 5A, 5B, and 5C shows actual device configuration data for a different image forming apparatus. Actual device configuration data has data items including a data type 602 and a value 603. The data type 602 is the type of data included in actual device configuration data. A model code for identifying the model of an image forming apparatus, a firmware version, a device identifier for identifying a device, and the like are set to the data type 602. The value 603 is the value of data. A value (e.g., the value of a device identifier, the presence/absence of a facsimile unit, or the like) corresponding to the data type is set to the value 603. Note that virtual device configuration data has the same data configuration as that of actual device configuration data. Thus, a description will be given of the actual configuration data shown in FIG. 5 as virtual configuration data as appropriate.

Referring back to FIG. 3, the tenant identifier holding unit 305 holds a tenant identifier that is the identifier of a tenant to which the image forming apparatus 101 belongs. The tenant identifier is set upon initial installation of the image forming apparatus 101 and is stored in the auxiliary storage device 204A so as not to be lost even when the power is OFF.

The actual device configuration data notifying unit 306 notifies the actual device configuration data receiving unit 318 provided in the set value management service 310 of the actual device configuration data collected by the actual device configuration data collecting unit 304 and the tenant identifier held by the tenant identifier holding unit 305. More specifically, the actual device configuration data notifying unit 306 transmits a configuration data generation request including the actual device configuration data and the tenant identifier to the actual device configuration data receiving unit 318. The configuration data generation request is a request (operation setting generation request) for generating virtual configuration data corresponding to the image forming apparatus 101.

When the image forming apparatus 101 is replaced, the replacement executing unit 340 functions as a replace requesting unit that requests the replace request to the set value management service 310 via the Internet. The replace request is a request that requests for updating (replacing) virtual configuration data retained by the virtual device corresponding to the replaced image forming apparatus 101 to the setting after being replaced.

Also, the replacement executing unit 340 functions as a halting unit that halts a function of the image forming apparatus in response to an instruction (a function halting request) from the halt function selecting unit 333 included in the set value management service 310. Also, the replacement executing unit 340 functions as resuming unit that resumes the function of the image forming apparatus that has halted the function in response to an instruction (a halted function releasing request) from the halt function selecting unit 333 included in the set value management service 310.

The version managing unit 341 determines whether or not the information has been generated by using the newest configuration data based on a version of configuration data of which the image forming apparatus is a generation source of that information received from the external device. In the present embodiment, it is assumed that version information indicating the version of virtual configuration data is associated with virtual configuration data corresponding to the image forming apparatus 101. In the present embodiment, the image forming apparatus 101 to be replaced is assumed to be a first image forming apparatus. The image forming apparatus that needs to update configuration data as a result of replacement of the image forming apparatus 101 is assumed to be a second image forming apparatus. The image forming apparatus that generates transmission information by using configuration data of the second image forming apparatus and transmits the generated transmission information to the first image forming apparatus is assumed to be a third image forming apparatus.

The version managing unit 341 provided in the first image forming apparatus receives transmission information from the third image forming apparatus. The version managing unit 341 functions as a comparison requesting unit that requests the comparison request of version information to the version comparing unit 334 provided in the set value management service 310. The comparison request included in the version information is a request for comparison processing of the version information. This comparison processing is processing for comparing the version information of virtual configuration data about the second image forming apparatus included in the transmission information with the version information of virtual configuration data about the second image forming apparatus retained by the virtual device holding unit 311 provided in the set value management service 310. The comparison request of the version information includes version information of virtual configuration data about the second image forming apparatus included in the transmission information.

Also, the version managing unit 341 receives an execution result of comparison processing from the version comparing unit 334. When the received execution result of comparison processing indicates that the version information of virtual configuration data included in the transmission information matches the version information retained by the virtual device holding unit 311, the version managing unit 341 performs following processing. The version managing unit 341 determines that the transmission information has been generated based on the newest virtual configuration data.

The set value management service 310 includes a virtual device holding unit 311, the model-specific set value schema holding unit 312, a model-specific set value schema updating unit 313, a tenant configuration data holding unit 314, and a tenant configuration data updating unit 315. The set value management service 310 also includes a virtual configuration data generating unit 316, a virtual configuration data updating unit 317, an actual device configuration data receiving unit 318, and a virtual device configuration data updating unit 319. The set value management service 310 also includes a virtual configuration data acquiring unit 320, a virtual configuration data viewing unit 321, a virtual configuration data update confirming unit 322, and a replace managing unit 330.

The virtual device holding unit 311 holds the virtual device. The virtual device includes at least virtual device configuration data and virtual configuration data. In other words, the virtual device holding unit 311 functions as a holding unit that holds operation setting information of the image forming apparatus. The virtual device holding unit 311 stores and manages the virtual device in the auxiliary storage device 204C.

Figure 6:
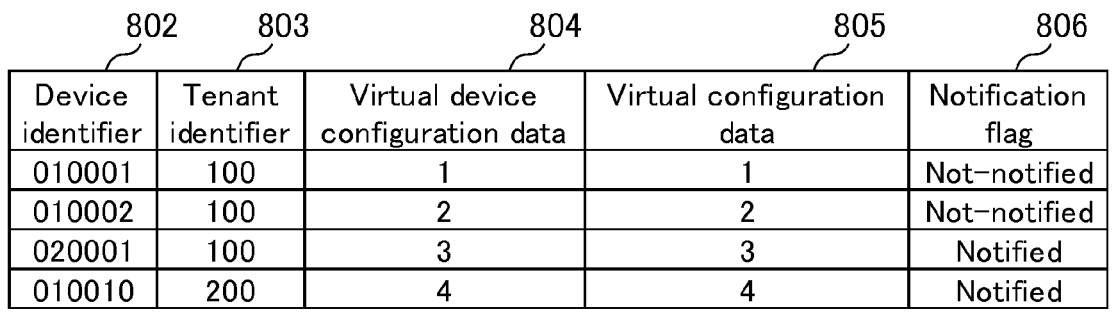
FIG. 6 is a diagram illustrating an exemplary virtual device.

FIG. 6 is a diagram illustrating an exemplary virtual device. The virtual device shown in FIG. 6 has a device identifier 802, a tenant identifier 803, an virtual device configuration data 804, a virtual device configuration data 805, and a virtual configuration data 806.

The device identifier 802 is identification information for uniquely identifying a virtual device. The device identifier 802 corresponds to identification information for uniquely identifying the image forming apparatus 101 corresponding to the virtual device. The device identifier 802 is included in device configuration data which is notified by the image forming apparatus 101 to the set value management service 310. The tenant identifier 803 is identification information for uniquely identifying a tenant to which the image forming apparatus 101 corresponding to the virtual device belongs.

The virtual device configuration data 804 is identification information for uniquely identifying virtual device configuration data. Virtual device configuration data corresponds to device configuration data (actual device configuration data) of the image forming apparatus 101 corresponding to the virtual device. Virtual configuration data 805 is identification information for uniquely identifying virtual configuration data. Virtual configuration data corresponds to configuration data of the image forming apparatus 101 corresponding to the virtual device (actual configuration data).

The notification flag 806 indicates whether or not the image forming apparatus has already been notified of virtual configuration data 805. The flag "not-notified" set in the notification flag 806 indicates that the image forming apparatus has not been notified of virtual configuration data 805. The flag "notified" set in the notification flag 806 indicates that the image forming apparatus has already been notified of virtual configuration data 805.

Referring back to FIG. 3, the model-specific set value schema holding unit 312 holds the model-specific set value schema. One model-specific set value schema is prepared corresponding to each model of image forming apparatuses.

FIGS. 7A and 7B are diagrams illustrating an exemplary model-specific set value schema. FIG. 7A shows a model-specific set value schema corresponding to the model code of 0x01. FIG. 7B shows a model-specific set value schema corresponding to the model code of 0x02. The model-specific set value schema has data items including a set value identifier 402, a default value 403, a value range 404, and a condition 405.

The set value identifier 402 is identification information for uniquely identifying a setting item. For example, the set value identifier "copy_settings.nup" indicates a setting item relating to imposition in copy settings. If the set value identifiers 402 are identical, it indicates the fact that the setting items are identical in spite of different models. The default value 403 is a default set value for the model. The value range 404 is a definition of a range which can be set in the model. For example, the value range 404 of the set value identifier "copy_settings.nup" indicates that the value range can be selected from three types of copy settings "1 in 1, 2 in 1, and 4 in 1" in the model.

The condition 405 is a definition of the conditions necessary for using set values in the model. The condition "facsimile unit" is set in the condition 405 corresponding to the setting item of "fax_settings.received_print". Thus, the set value for the setting item becomes valid only when mounting of a facsimile unit is confirmed.

Referring back to FIG. 3, the model-specific set value schema updating unit 313 updates the model-specific set value schema held by the model-specific set value schema holding unit 312. For example, when a vendor of the image forming apparatus releases a new model, a model-specific set value schema corresponding to the new model is registered in accordance with the instruction given by the administrator of the vendor. If any setting item is changed, the model-specific set value schema updating unit 313 updates the model-specific set value schema. The tenant configuration data holding unit 314 holds configuration data of which the tenant hopes to set in the image forming apparatus.

Figure 8:
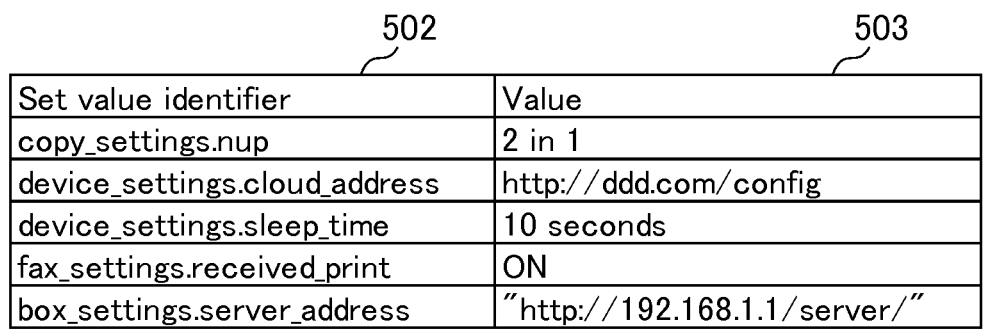
FIG. 8 is a diagram illustrating an example of tenant configuration data.

FIG. 8 is a diagram illustrating an example of tenant configuration data. Tenant configuration data has data items including a set value identifier 502 and a value 503. The set value identifier 502 is the same as the set value identifier 402 included in the model-specific set value schema shown in FIG. 7. The value 503 is a common setting value desired by a tenant. The copy setting "2 in 1" is set in the set value identifier "copy_settings.nup". This indicates that the user desires that the copy setting "2 in 1" be set in all image forming apparatuses held by a tenant.

Referring back to FIG. 3, the tenant configuration data updating unit 315 updates tenant configuration data held by the tenant configuration data holding unit 314. In accordance with the operation by a service person who manages image forming apparatuses held by a tenant, the terminal apparatus 102B in the service person environment 110 provides an update instruction for tenant configuration data. The tenant configuration data updating unit 315 updates tenant configuration data in accordance with the update instruction. Note that the service person performs operation on a setting screen which is displayed on a web browser running on the terminal apparatus 102B.

The virtual configuration data generating unit 316 generates virtual configuration data based on the model-specific set value schema, tenant configuration data, and virtual device configuration data. Firstly, the virtual configuration data generating unit 316 acquires virtual device configuration data shown in FIG. 5A from the virtual device holding unit 311.

Next, the virtual configuration data generating unit 316 refers to a model code included in the acquired virtual device configuration data to thereby specify the model of the image forming apparatus. Using the virtual device configuration data shown in FIG. 5A as an example, 0x01 is set as a value corresponding to the model code. Thus, the virtual configuration data generating unit 316 specifies the model of the image forming apparatus having the model code of 0x01.

Next, the virtual configuration data generating unit 316 acquires a model-specific set value schema corresponding to the specified model code from the model-specific set value schema holding unit 312. The virtual configuration data generating unit 316 acquires, for example, the model-specific set value schema shown in FIG. 7A, of which the model code matches 0x01.

Next, the virtual configuration data generating unit 316 generates virtual configuration data based on the set values defined in the acquired model-specific set value schema. Using the model-specific set value schema shown in FIG. 7A as an example, the virtual configuration data generating unit 316 generates virtual configuration data based on set values corresponding to five setting items "copy_settings.nup", "device_settings.cloud_address", "device_settings.sleep_time", "fax_settings.received_print", and "box_settings.server_address".

Next, the virtual configuration data generating unit 316 acquires tenant configuration data shown in FIG. 8 from the tenant configuration data holding unit 314. The virtual configuration data generating unit 316 determines whether or not the set value included in tenant configuration data falls within the value range defined in the model-specific set value schema.

A description will be given by taking an example of tenant configuration data shown in FIG. 8 and model-specific set value schema shown in FIG. 7A. The value (set value) for the setting item "copy_settings.nup" included in tenant configuration data is "2 in 1". On the other hand, the value range corresponding to the setting item, which is defined in the model-specific set value schema, is "1 in 1, 2 in 1, and 4 in 1". Thus, the set value included in tenant configuration data falls within the value range defined in the model-specific set value schema.

The value (set value) for the setting item "device_settings.sleep_time" included in tenant configuration data is "10 seconds". On the other hand, the value range corresponding to the setting item, which is defined in the model-specific set value schema, is "1 minute, 10 minutes, and 1 hour". Thus, the set value included in tenant configuration data does not fall within the value range defined in the model-specific set value schema. When the set value included in tenant configuration data does not fall within the value range defined in the model-specific set value schema, the virtual configuration data generating unit 316 acquires the default value defined in the model-specific set value schema. In this example, the default value "10 minutes" is acquired. The virtual configuration data generating unit 316 uses the acquired default value as the set value for the setting item in virtual configuration data.

When the set value included in tenant configuration data falls within the value range defined in the model-specific set value schema, the virtual configuration data generating unit 316 takes the set value included in tenant configuration data as the set value corresponding to the setting item of virtual configuration data.

Next, the virtual configuration data generating unit 316 determines whether or not virtual device configuration data satisfies the condition defined in the model-specific set value schema. Referring to the model-specific set value schema shown in FIG. 7A, there is no particular condition corresponding to "copy_settings.nup". Thus, virtual device configuration data shown in FIG. 5A satisfies the condition corresponding to "copy_settings.nup".

However, the condition corresponding to "fax_settings.received_print" is "facsimile unit", whereas the value "none" is set as a value for "facsimile unit" included in virtual device configuration data. Thus, virtual device configuration data does not satisfy the condition corresponding to the setting item.

When virtual device configuration data does not satisfy the condition defined in the model-specific set value schema, the virtual configuration data generating unit 316 acquires the default value 403 defined in the model-specific set value schema. In this example, the virtual configuration data generating unit 316 acquires a default value "OFF" corresponding to "fax_settings.received_print". The virtual configuration data generating unit 316 uses the acquired default value as the set value for the setting item in virtual configuration data.

Referring back to FIG. 3, the virtual configuration data updating unit 317 updates virtual configuration data in the virtual device held by the virtual device holding unit 311 with virtual configuration data generated by the virtual configuration data generating unit 316.

More specifically, among the virtual devices held by the virtual device holding unit 311, the virtual configuration data updating unit 317 acquires a virtual device having a device identifier corresponding to the generated virtual configuration data. Then, the virtual configuration data updating unit 317 updates virtual configuration data retained by the acquired virtual device by replacing it with the generated virtual configuration data. When the notification flag 807 of the virtual device is "notified", the virtual configuration data updating unit 317 sets the flag "notified" to "not-notified". The setting of the notification flag 806 "not-notified" means that virtual configuration data corresponding to an image forming apparatus is changed so that the image forming apparatus needs to refer to new virtual configuration data.

The actual device configuration data receiving unit 318 receives device configuration data (FIGS. 5A to 5C) and the tenant identifier from the actual device configuration data notifying unit 306 provided in the image forming apparatus 101. The virtual device configuration data updating unit 319 updates virtual device configuration data retained by the virtual device held by virtual device holding unit 311 by replacing it with the device configuration data received by receiving unit 318. Specifically, the virtual device configuration data updating unit 319 acquires the virtual device that has the device identifier set in the device configuration data received by the actual device configuration data receiving unit 318 from among the virtual devices held by the virtual device holding unit 311. Then, the virtual device configuration data updating unit 319 updates virtual device configuration data retained by the acquired virtual device by replacing it with the device configuration data received by the actual device configuration data receiving unit 318.

The virtual configuration data acquiring unit 320 receives a virtual configuration data acquisition request from the virtual configuration data receiving unit 303 provided in the image forming apparatus 101 via the Internet 104 to thereby acquire virtual configuration data from the virtual device holding unit 311.

The virtual configuration data acquisition request includes at least a device identifier for specifying a virtual device. Thus, the virtual configuration data acquiring unit 320 searches for a virtual device having a device identifier included in the virtual configuration data acquisition request. The virtual configuration data acquiring unit 320 acquires virtual configuration data in the searched virtual device. Then, the virtual configuration data acquiring unit 320 passes the acquired virtual configuration data to the request source, i.e., the virtual configuration data receiving unit 303 via the Internet 104.

The virtual configuration data viewing unit 321 receives a configuration data viewing request from an external device via the Internet 104. The configuration data viewing request is a request on/using an HTTP protocol. The virtual configuration data viewing unit 321 acquires virtual configuration data corresponding to the viewing request and generates a HTML page for viewing for the acquired virtual configuration data to return the HTML page for viewing to the request source.

The virtual configuration data update confirming unit 322 confirms whether or not virtual configuration data has been updated. More specifically, the virtual configuration data receiving unit 303 provided in the image forming apparatus 101 transmits the device identifier of the image forming apparatus 101 to the virtual configuration data update confirming unit 322 via the Internet 104. The virtual configuration data update confirming unit 322 searches a virtual device having the received device identifier from the virtual devices held by the virtual device holding unit 311. The virtual configuration data update confirming unit 322 refers to the notification flag 806 for the searched virtual device.

When the notification flag 806 is "not-notified", the virtual configuration data update confirming unit 322 determines that virtual configuration data has been updated. When the notification flag 806 is "notified", the virtual configuration data update confirming unit 322 determines that the virtual configuration data has not been updated. The virtual configuration data update confirming unit 322 returns the update status of the virtual configuration data to the virtual configuration data receiving unit 303. Then, the virtual configuration data receiving unit 303 that has confirmed the updating of the virtual configuration data makes a configuration data acquisition request to the virtual configuration data acquiring unit 320 of the set value management service 310.

The virtual configuration data update confirming unit 322 may also confirm whether or not virtual configuration data has been updated using the updating of virtual configuration data by the virtual configuration data updating unit 317 as a trigger. Then, when the virtual configuration data update confirming unit 322 confirms that the virtual configuration data has been updated, the virtual configuration data acquiring unit 320 may also acquire configuration data and transmit it to the actual configuration data update notifying unit 308 provided in the image forming apparatus 101.

The actual configuration data update receiving unit 323 receives an update content of actual configuration data from the actual configuration data update notifying unit 308 of the image forming apparatus 101 via the Internet 104. Then, the actual configuration data update receiving unit 323 notifies the virtual configuration data updating unit 317 of the update content of received actual configuration.

The replace managing unit 330 functions as a request receiving unit that receives the replace request from the replacement executing unit 340 of the replaced image forming apparatus 101 via the Internet. The replace request include identification information of the replaced image forming apparatus 101, and the setting value changed due to replacement that is corresponding to the image forming apparatus 101. The replace managing unit 330 then executes processing in response to the replace request (replace processing). Replace processing includes update processing of virtual configuration data of the replaced image forming apparatus, search processing of other the image forming apparatus that needs to update virtual configuration data as a result of replacement of the image forming apparatus, and update processing of virtual configuration data of the searched image forming apparatus.

The replace managing unit 330 includes a virtual device searching unit 331, a virtual configuration data changing unit 332, a halt function selecting unit 333, and a version comparing unit 334. The virtual device searching unit 331 receives the replace request from the replacement executing unit 340 of the replaced image forming apparatus 101. In the present embodiment, the replaced image forming apparatus also described as the first image forming apparatus. The virtual device searching unit 331 functions as a searching unit that searches other the image forming apparatus that needs to update virtual configuration data accompanied with replacement and corresponds to the received replace request (the second image forming apparatus).

In the present embodiment, the replace request, for example, includes a MAC address of the first image forming apparatus after being replaced. Among virtual configuration data held by virtual device that is held by the virtual device holding unit 311, the virtual device searching unit 331 acquires virtual configuration data of which a MAC filter that registers the MAC address is set. Then, the virtual device searching unit 331 outputs the image forming apparatus corresponding to the acquired virtual configuration data as the search result, that is, the second image forming apparatus.

Among virtual configuration data included in the virtual device held by the virtual device holding unit 311, the virtual configuration data changing unit 332 functions as an updating unit that updates the setting value of virtual configuration data of the second image forming apparatus to the setting value included in the replace request. The virtual configuration data changing unit 332 also acquires virtual configuration data of the image forming apparatus 101 from the virtual device held by the virtual device based on the identification information of the image forming apparatus 101 included in the replace request. Then, the virtual configuration data changing unit 332 updates the setting value of the acquired virtual configuration data by replacing it with the setting value included in the replace request.

The halt function selecting unit 333 selects a function of which the first image forming apparatus halts until the virtual configuration data changing unit 332 finishes changing virtual configuration data of the second image forming apparatus. In other words, the halt function selecting unit 333 functions as selecting unit that selects the function which the first image forming apparatus halts until the virtual configuration data changing unit 332 finishes updating operation setting information of the second image forming apparatus among functions provided in the first image forming apparatus.

Also, the halt function selecting unit 333 functions as halt instructing unit that requests (transmits the function halting request) the replacement executing unit 340 provided in the first image forming apparatus to halt the selected function. The halt function selecting unit 333 also functions as resumption instructing unit that executes following processing. In other words, the halt function selecting unit 333 requests the replacement executing unit 340 provided in the first image forming apparatus to resume the halted function (transmit the halted function releasing request) when the halt function selecting unit 333 has confirmed completion of a setting change about virtual configuration data of the second image forming apparatus.

The version comparing unit 334 receives a comparison request of version information from the version managing unit 341 provided in the replaced image forming apparatus 101. The version information is information regarding the version of virtual configuration data. The version comparing unit 334 executes following comparison processing in response to the received the comparison request.

Firstly, the version comparing unit 334 acquires version information included in the comparison request as first version information. The version comparing unit 334 also acquires the virtual device of the second image forming apparatus corresponding to the comparison request from the virtual device holding unit 311. The version comparing unit 334 also acquires version information of virtual configuration data retained by the virtual device as second version information. Then, the version comparing unit 334 compares the received first version information with the second version information, and determines whether or not the first version information matches the second version information. The version comparing unit 334 transmits a comparison result to the version managing unit 341 provided in the first image forming apparatus.

Figure 9:
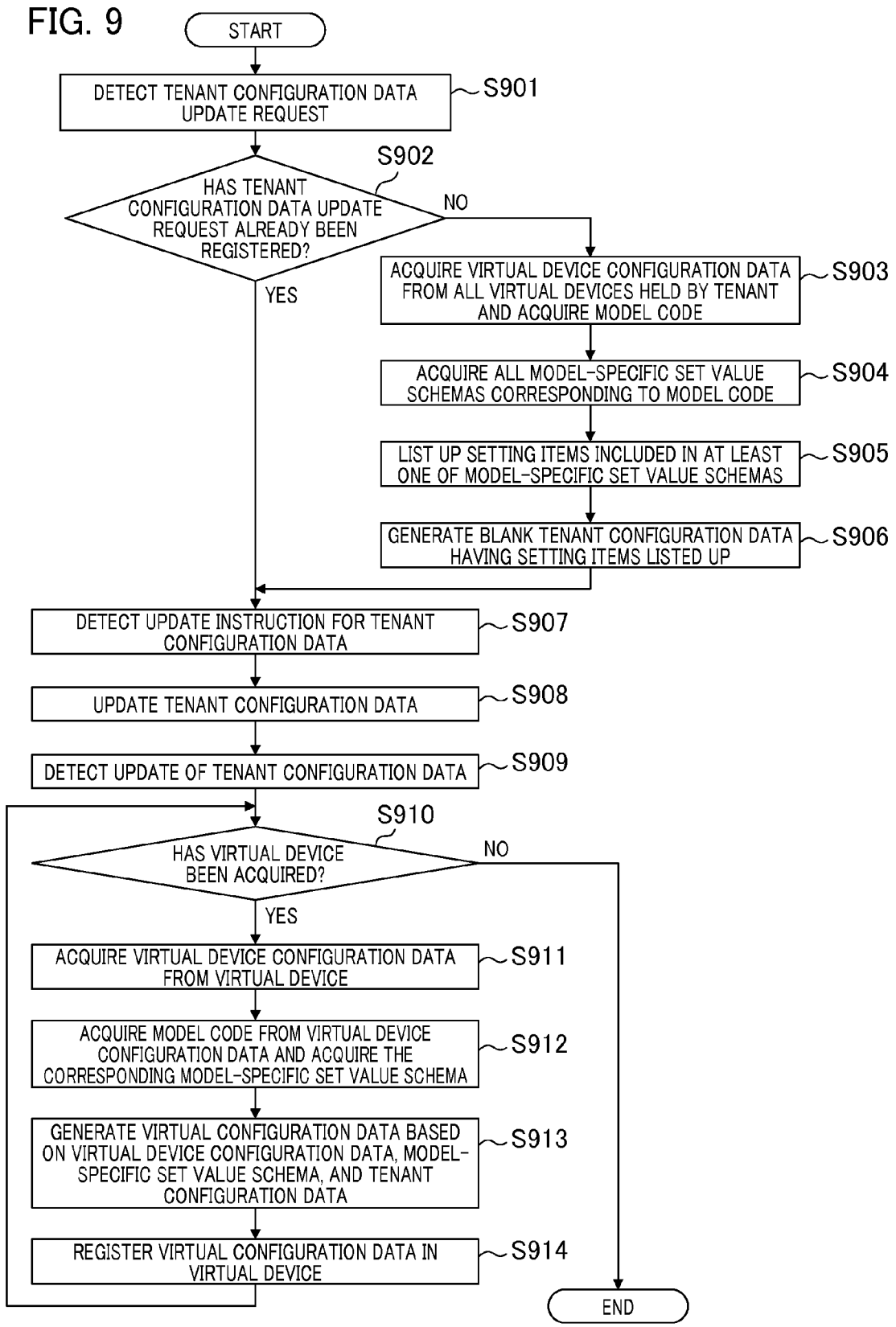
FIG. 9 is a diagram illustrating update processing of tenant configuration data.

FIG. 9 is an example of a flowchart describing update processing of tenant configuration data. In this example, the administrator updates tenant configuration data by using the terminal device A. A program that realizes processing of each step of the flowchart is stored in any one of storage unit among non-volatile memory 202C, a volatile memory 203C, or an auxiliary storage device 204C, and executed by the CPU 201C.

Firstly, the tenant configuration data updating unit 315 detects a tenant configuration data update request transmitted from the terminal apparatus 102A (step S901). Next, the tenant configuration data updating unit 315 confirms whether or not tenant configuration data corresponding to the tenant configuration data update request has already been registered to the tenant configuration data holding unit 314 (step S902). When tenant configuration data corresponding to the tenant configuration data update request has already been registered, the process advances to step S907. When tenant configuration data corresponding to the tenant configuration data update request has not yet been registered, the process advances to step S903.

In step S903, the tenant configuration data updating unit 315 acquires a virtual device held by a tenant from the virtual device holding unit 311. The tenant configuration data updating unit 315 acquires virtual device configuration data included in the acquired virtual device. Then, the tenant configuration data updating unit 315 acquires a model code included in the acquired virtual device configuration data (step S903).

Next, the tenant configuration data updating unit 315 acquires model-specific set value schemas corresponding to the acquired model code from the model-specific set value schema holding unit 312 (step S904). Next, the tenant configuration data updating unit 315 lists the setting items included in at least one of the model-specific set value schemas acquired in step S904 (step S905). Then, the tenant configuration data updating unit 315 generates blank tenant configuration data having the setting items listed up in step S905 (step S906), and the process advances to step S907.

In step S907, the tenant configuration data updating unit 315 detects a specific update instruction for tenant configuration data (step S907). Then, the tenant configuration data updating unit 315 updates tenant configuration data based on the update instruction detected in step S907 (step S908). The tenant configuration data holding unit 314 stores the updated tenant configuration data.

Next, the virtual configuration data generating unit 316 detects that tenant configuration data has been updated (step S909). Then, the virtual configuration data generating unit 316 searches a virtual device, of which the tenant identifier matches the tenant identifier of tenant configuration data of which an update has been detected, from the virtual devices held by the virtual device holding unit 311. In order to perform processing for the searched virtual devices in sequence, the virtual configuration data generating unit 316 acquires one virtual device. The virtual configuration data generating unit 316 determines whether or not the virtual device is successively acquired (step S910). When processing for all virtual devices is performed in sequence and the next virtual device cannot be acquired, the process ends. When the virtual configuration data generating unit 316 successively acquires the next virtual device, the process advances to step S911.

In step S911, the virtual configuration data generating unit 316 acquires virtual device configuration data from a virtual device to be processed (step S911). Next, the virtual configuration data generating unit 316 acquires a model code from virtual device configuration data acquired in step S911. Then, the virtual configuration data generating unit 316 acquires a model-specific set value schema corresponding to the acquired model code from the model-specific set value schema holding unit 312 (step S912).

Next, the virtual configuration data generating unit 316 generates virtual configuration data based on the virtual device configuration data, model-specific set value schema, and tenant configuration data (step S913). Then, the virtual configuration data updating unit 317 registers the generated virtual configuration data in the virtual device (step S914), and the process returns to step S910. Through the process in step S914, the updated tenant configuration data is reflected in the virtual device.

Figure 10:
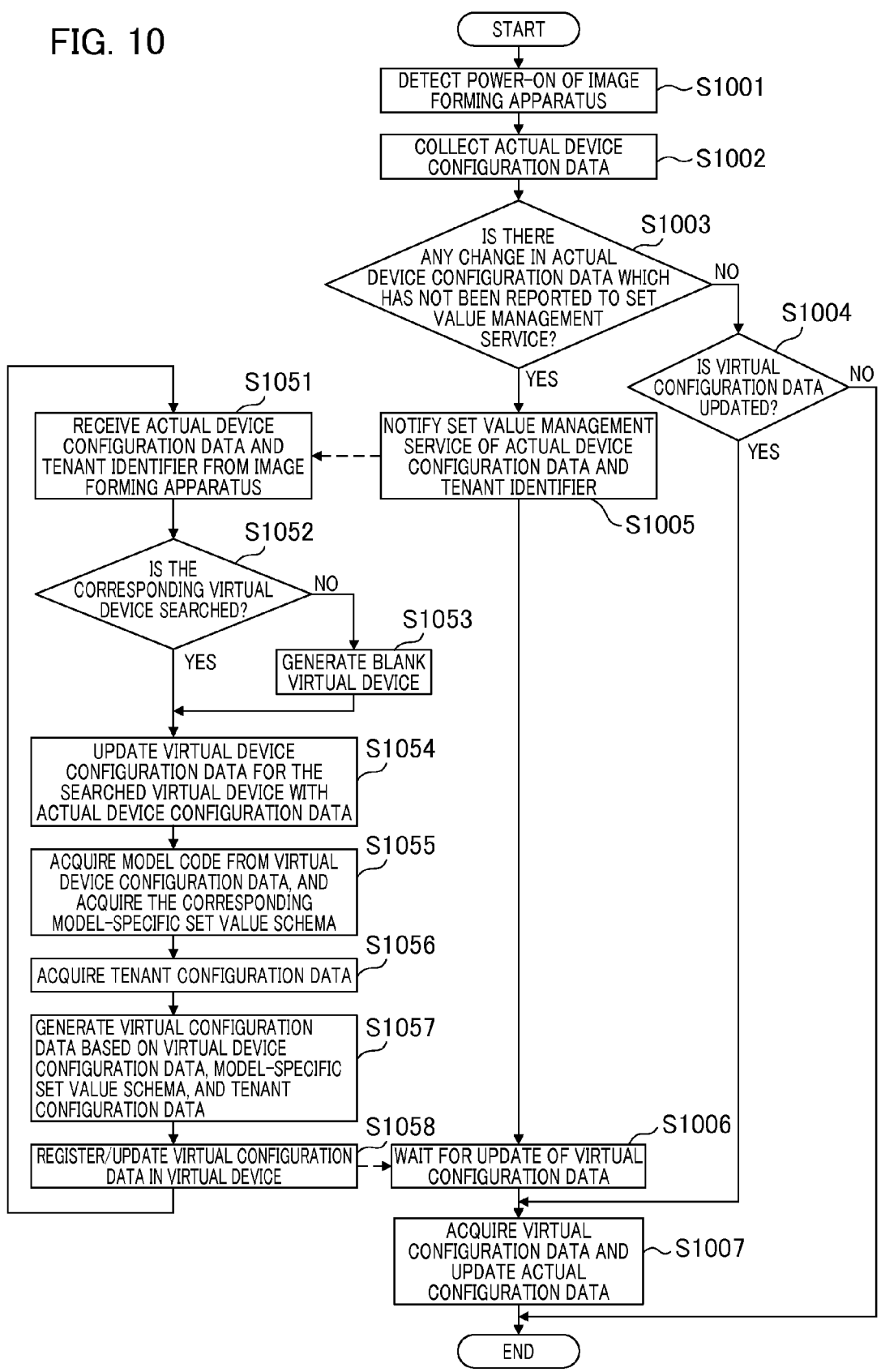
FIG. 10 is a diagram describing processing in which the image forming apparatus acquires virtual configuration data.
Figure 12:
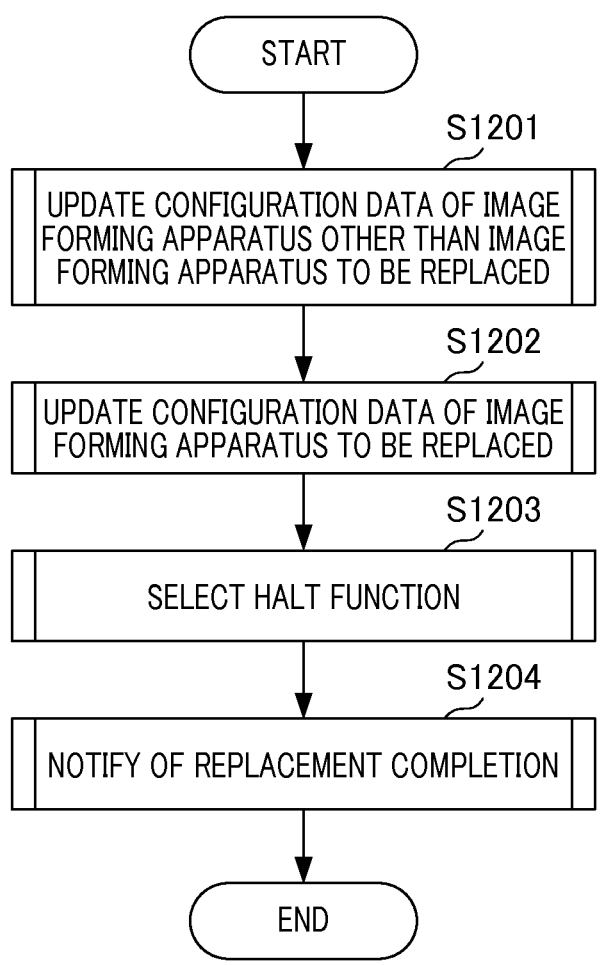
FIG. 12 is a flowchart illustrating an exemplary operation processing of a set value management service upon replacement of the image forming apparatus.

FIG. 10 is an exemplary flowchart illustrating processing for acquiring virtual configuration data by an image forming apparatus. The processes to be described with reference to FIG. 10 correspond to the use of configuration data closed in one tenant. The steps in steps S1001 to S1007 shown in FIG. 102 are executed by an image forming apparatus. A program for executing the steps memory 202A, the volatile memory 203A, and the auxiliary storage device 204A and is executed by the CPU 201A. Also, the steps in steps S1051 to S1058 shown in FIG. 12 are executed by the server computer group 105. A program for executing the steps in steps of the flowchart shown in FIG. 10 is stored in any one of the storage units that are the non-volatile memory 202C, the volatile memory 203C, and the auxiliary storage device 204C, and is executed by the CPU 201C.

Firstly, the actual device configuration data notifying unit 306 of the image forming apparatus 101 detects the power-ON of the image forming apparatus 101 (step S1001). Next, the actual device configuration data collecting unit 304 collects actual device configuration data (step S1002).

Next, the actual device configuration data notifying unit 306 functions as a configuration change determining unit that determines whether there is any change in configuration information about the devices provided in the image forming apparatus 101. More specifically, the actual device configuration data notifying unit 306 determines whether there is any change in actual device configuration data, which has not been reported to the set value management service 310, based on actual device configuration data collected in step S1002 (step S1003).

If there is any change in actual device configuration data which has not been reported, the process advances to step S1005. If there is no change in actual device configuration data which has not been reported, the process advances to step S1004. When a new device is installed, the process advances to step S1005.

In step S1004, the virtual configuration data receiving unit 303 determines whether or not the device has already acquired the latest virtual configuration data, that is, the virtual configuration data has already been updated (step S1004). More specifically, the virtual configuration data receiving unit 303 confirms with the virtual configuration data update confirming unit 322 of the set value management service 310 via the Internet 104 whether or not virtual configuration data has been updated. The virtual configuration data receiving unit 303 determines whether or not virtual configuration data has been updated based on the confirmation result. If virtual configuration data has not been updated, the process ends. If virtual configuration data has been updated, the process advances to step S1007.

In step S1005, the actual device configuration data notifying unit 306 notifies the set value management service 310 about a configuration data generation request including actual device configuration data and the tenant identifier (step S1005). The notification destination address is an address held by the actual configuration data holding unit 301.

In step S1051, the set value management service 310 detects the notification and then perform processing. A detailed description of processing executed by the set value management service 310 will be given below.

Next, the virtual configuration data receiving unit 303 waits for the execution of the processing until the updating of virtual configuration data is completed (step S1006). Next, the virtual configuration data receiving unit 303 receives virtual configuration data from the set value management service 310. Then, the virtual configuration data updating unit 317 updates the received virtual configuration data as actual configuration data (step S1007). Actual configuration data is stored by the actual configuration data holding unit 301.

In step S1051, the actual device configuration data receiving unit 318 of the set value management service 310 accepts the configuration data generation request including actual device configuration data and the tenant identifier from the image forming apparatus 101 (step S1051).

Next, among the virtual devices held by the virtual device holding unit 311, the virtual device configuration data updating unit 319 searches for a virtual device that matches the actual device configuration data and the tenant identifier both included in the configuration data generation request received in S1051 (step S1054). If the matched virtual device has been found, the process advances to step S1054. If the matched virtual device has not been found, the process advances to step S1053. When an image forming apparatus communicates with the set value management service 310 for the first time upon installation of a new device, there may be cases where searching for a virtual device is not possible. Thus, in this case, the process advances to step S1053.

In step S1053, the virtual device configuration data updating unit 319 generates a blank virtual device (step S1053), and the process advances to step S1054. Next, the virtual device configuration data updating unit 319 updates virtual device configuration data for the virtual device searched in S1052 with actual device configuration data included in the configuration data generation request received in step S1051 (step S1054). Also, the virtual device configuration data updating unit 319 sets actual device configuration data included in the configuration data generation request received in step S1051 as virtual device configuration data for the virtual device generated in step S1053. With this arrangement, the virtual device corresponding to the image forming apparatus 101 is updated.

Next, the virtual configuration data generating unit 316 acquires a model code from virtual device configuration data updated in step S1056. Then, the virtual configuration data generating unit 316 acquires a model-specific set value schema corresponding to the acquired model code from the model-specific set value schema holding unit 312 (step S1055).

Next, the virtual configuration data generating unit 316 acquires tenant configuration data (step S1056). More specifically, the virtual configuration data generating unit 316 acquires tenant configuration data corresponding to the tenant identifier received in step S1051 from tenant configuration data held by the tenant configuration data holding unit 314.

Next, the virtual configuration data generating unit 316 generates virtual configuration data based on the virtual device configuration data, model-specific set value schema, and tenant configuration data (step S1057). The process in step S1057 is the same as that in step S913 shown in FIG. 11. In other words, the virtual configuration data generating unit 316 generates configuration data corresponding to the image forming apparatus 101 based on configuration information (device configuration data) included in the configuration data generation request.

Next, the virtual configuration data updating unit 317 updates the generated virtual configuration data by registering it in the virtual device in question (step S1058). In step S1058, the virtual configuration data acquiring unit 320 further transmits the generated virtual configuration data to the virtual configuration data receiving unit 303 of the image forming apparatus 101.

Next, description will be given of update processing of configuration data in the related image forming apparatus when the image forming apparatus is replaced. When the image forming apparatus is replaced, there are setting item of which same value as that of configuration data before being replaced is handed over, and the setting item of which the setting value of configuration data before being replaced is changed.

For example, with respect to an IP address, a device name, a URL, and an installation site, and the like, same value is likely to be handed over to the image forming apparatus after being replaced. Also, the setting item about unique date of the image forming apparatus and the setting item about data that is not exist in the image forming apparatus before being replaced are likely to be changed from the setting value before being replaced. For example, with respect to the MAC address or newly added capability information, or the like, the setting value is likely to be changed from the setting value before being replaced.

For example, other image forming apparatus statically on the network may hold the setting of which the value is changed from the setting value before being replaced as a result of replacement of the image forming apparatus. For example, it is assumed that other image forming apparatus has the MAC address filtering function. The MAC address filtering function is a function that registers the MAC address of correspondent in the MAC filter in advance, and decides reception permission/not-permission of received packet with reference to the MAC filter.

The image forming apparatus manages the MAC address filtering function needs to change the setting when the image forming apparatus corresponding to the registered MAC address is replaced. In other words, the image forming apparatus that manages the MAC address filtering function should change the MAC address before being replaced to the MAC address after being replaced.

For example, it is assumed that "permit packet reception other than registered address" is set in the MAC filter the MAC address of a certain image forming apparatus is the registered address. Before the image forming apparatus that manages the MAC filter changes the setting of the MAC filter, a packet is received by the image forming apparatus that manages the MAC filter when the replaced image forming apparatus transmits the packet to the image forming apparatus that manages the MAC filter.

Figure 11:
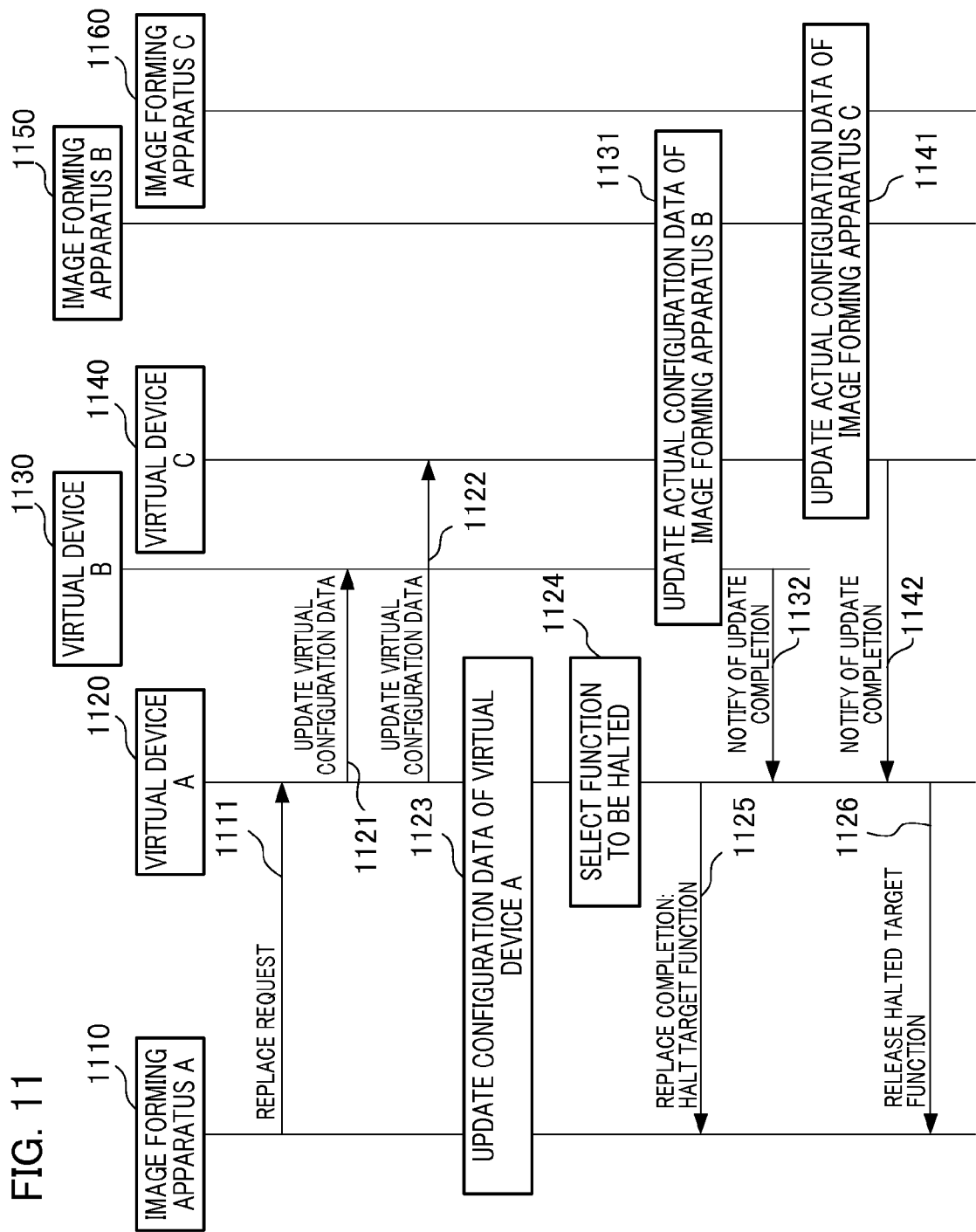
FIG. 11 is a diagram describing an example of operation processing by the information processing system.

FIG. 11 is a sequence diagram describing an exemplary operation processing of the information processing system. In FIG. 11, reference numbers 1110, 1150, and 1160 are the image forming apparatus A, B, C, respectively. Reference numbers 1120, 1130, and 1140 are the virtual device A, B, and C, respectively, and each virtual device corresponds to the image forming apparatus A(1110), B(1150), C(1160). In the following description, each processing that mainly the virtual device performs is executed by each processing unit provided in the set value management service 310 in response to processing of interest. Also, each processing for the virtual device is executed for the processing unit in response to processing of interest.

FIG. 11 illustrates processing when the image forming apparatus A is replaced, configuration data of the image forming apparatuses B and C is changed. Firstly, the image forming apparatus A transmits a message 1111 as a replace request to the virtual device A. The replace request includes the MAC address of the image forming apparatus A after being replaced. The virtual device A that has received the message 1111 searches the virtual device that needs to update virtual configuration data.

Specifically, among virtual configuration data, the virtual device searching unit 331 of the set value management service 310 searches the virtual device having virtual configuration data of which the MAC filter that registers the MAC address included in the replace request is set. When the virtual device searching unit 331 has obtained the virtual device B and C as a search result, the virtual device A updates virtual configuration data corresponding to the virtual device B and C by notifying the virtual device B and C of an update message (processing 1121 and 1122). Specifically, the virtual configuration data changing unit 332 changes virtual configuration data corresponding to the virtual device B and C. In the example of MAC filter, the virtual configuration data changing unit 332 changes from the MAC address value before being replaced to the MAC address value after being replaced.

Next, the virtual configuration data changing unit 332 updates configuration data held by the virtual device A (processing 1123). Also, the halt function selecting unit 333 selects the function to be halt if any until the setting of other image forming apparatus is completed (processing 1124) and notifies the image forming apparatus A of a message 1125 that instructs to halt the function until the setting of other image forming apparatus is completed. The image forming apparatus A that has been notified of the message halts the function of target.

While, the image forming apparatus B acquires the updated configuration data held by the image forming apparatus B and updates actual configuration data (processing 1131). The image forming apparatus C also performs similar processing (processing 1141). The image forming apparatus B and C notify the virtual device A of update completion when update processing of corresponding actual configuration data has completed (message 1132, 1142). The virtual device A that has been notified of update completion requests a release of the halted function. Specifically, the halt function selecting unit 333 notifies of a message 1126 that instructs the release of the function halted by the message 1125 when the halt function selecting unit 333 determines that all of actual configuration data to be updated has updated.

FIG. 12 is a flowchart illustrating an exemplary operation processing by the set value management service upon replacement of the image forming apparatus. The replace managing unit 330 of the set value management service 310 executes update processing of configuration data of the image forming apparatus other than the image forming apparatus to be replaced (step S1201). Processing in step S1201 corresponds to processing 1121 and 1122 shown in FIG. 11.

Next, the replace managing unit 330 executes update processing of configuration data of the image forming apparatus to be replaced (step S1202). Processing in step S1202 corresponds to processing 1123 shown in FIG. 11. Subsequently, the replace managing unit 330 executes processing for selecting function to be halted to the image forming apparatus to be replaced until the updating of other image forming apparatus is completed (step S1203). Processing in step S1203 corresponds to processing 1124 shown in FIG. 11.

Next, the replace managing unit 330 notifies the image forming apparatus that is the actual device of completion of replace processing (step S1204) to thereby end processing. Processing in step S1204 corresponds to processing 1125 shown in FIG. 11. The function selected in step S1203 is temporally halted by processing in step S1204.

Figure 13A:
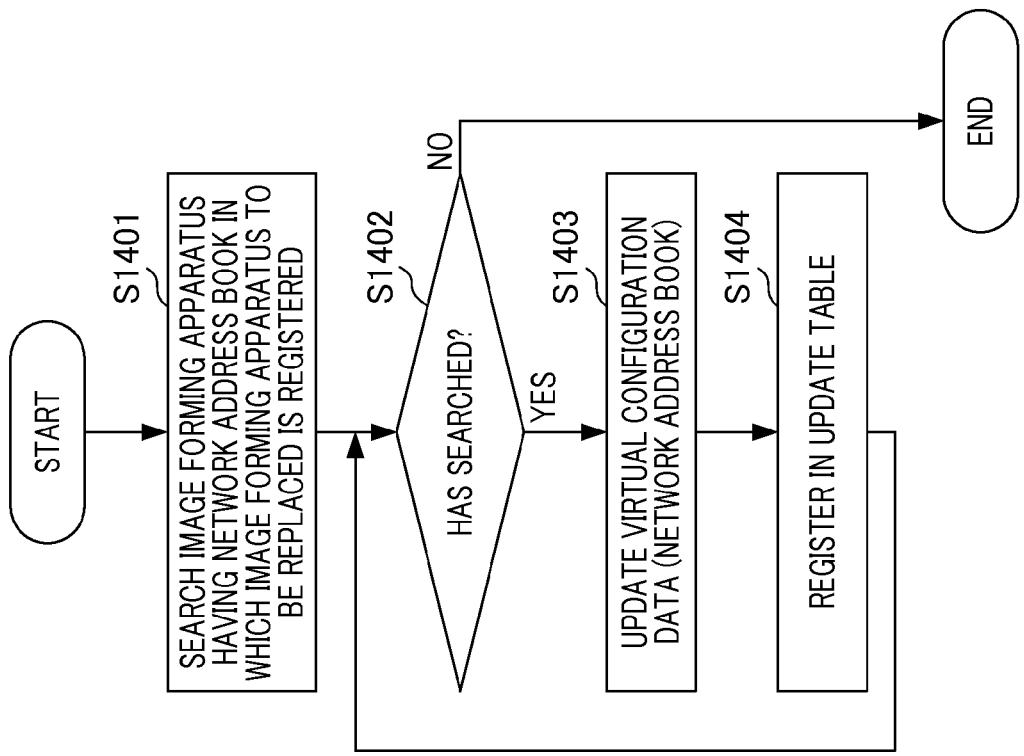
FIGS. 13A and 13B are flowcharts illustrating update processing of configuration data.
Figure 13B:
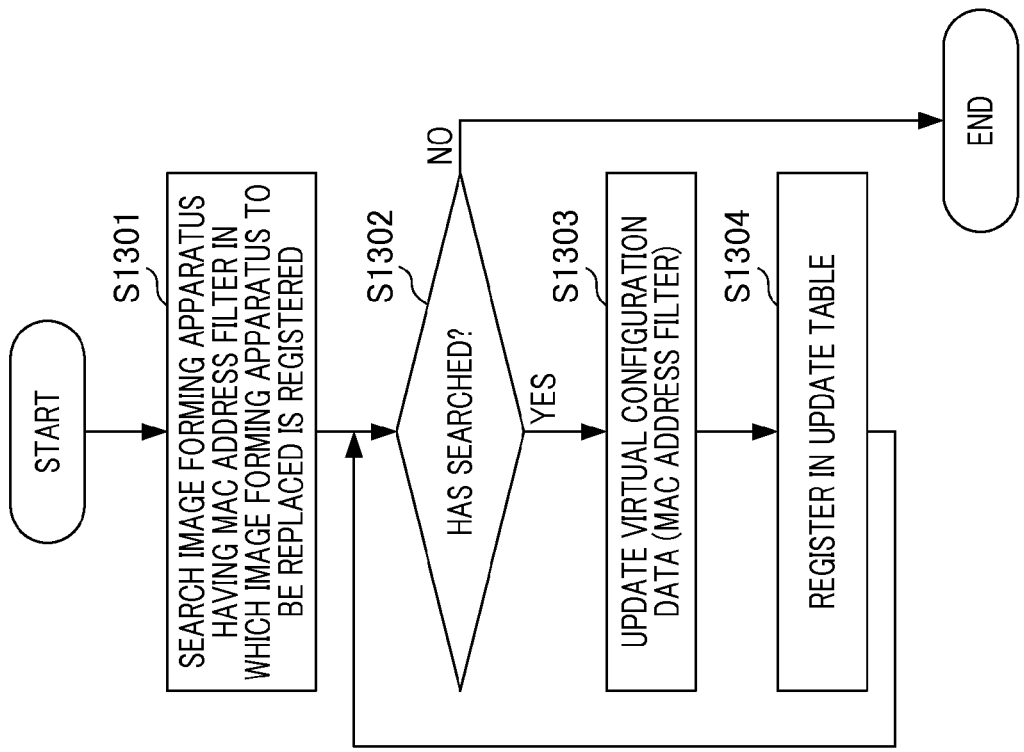

FIGS. 13A and 13B are flowcharts illustrating an exemplary detail processing in step S1201 shown in FIG. 12. FIG. 13A illustrates update processing of configuration data in the first embodiment. Firstly, the replace managing unit 330 searches the image forming apparatus using the MAC filter that registers the MAC address of the image forming apparatus to be replaced (step S1301). Specifically, the replace managing unit 330 searches virtual configuration data having the MAC filter to thereby find out the virtual device that needs to update.

Next, the replace managing unit 330 determines whether or not the virtual device that needs to update is present (step S1302). When no virtual device that needs to update is present, the process ends. When the virtual device that needs to update is present, the process advances to step S1303.

Next, the replace managing unit 330 updates the setting value of the MAC filter virtual of configuration data that needs to update (step S1303). Specifically, the replace managing unit 330 changes the MAC address value before being replaced to the MAC address value after being replaced. Subsequently, the replace managing unit 330 registers the virtual device that consists with a row of the MAC filter in the update table (step S1304), the process returns to step S1302.

Figure 14:
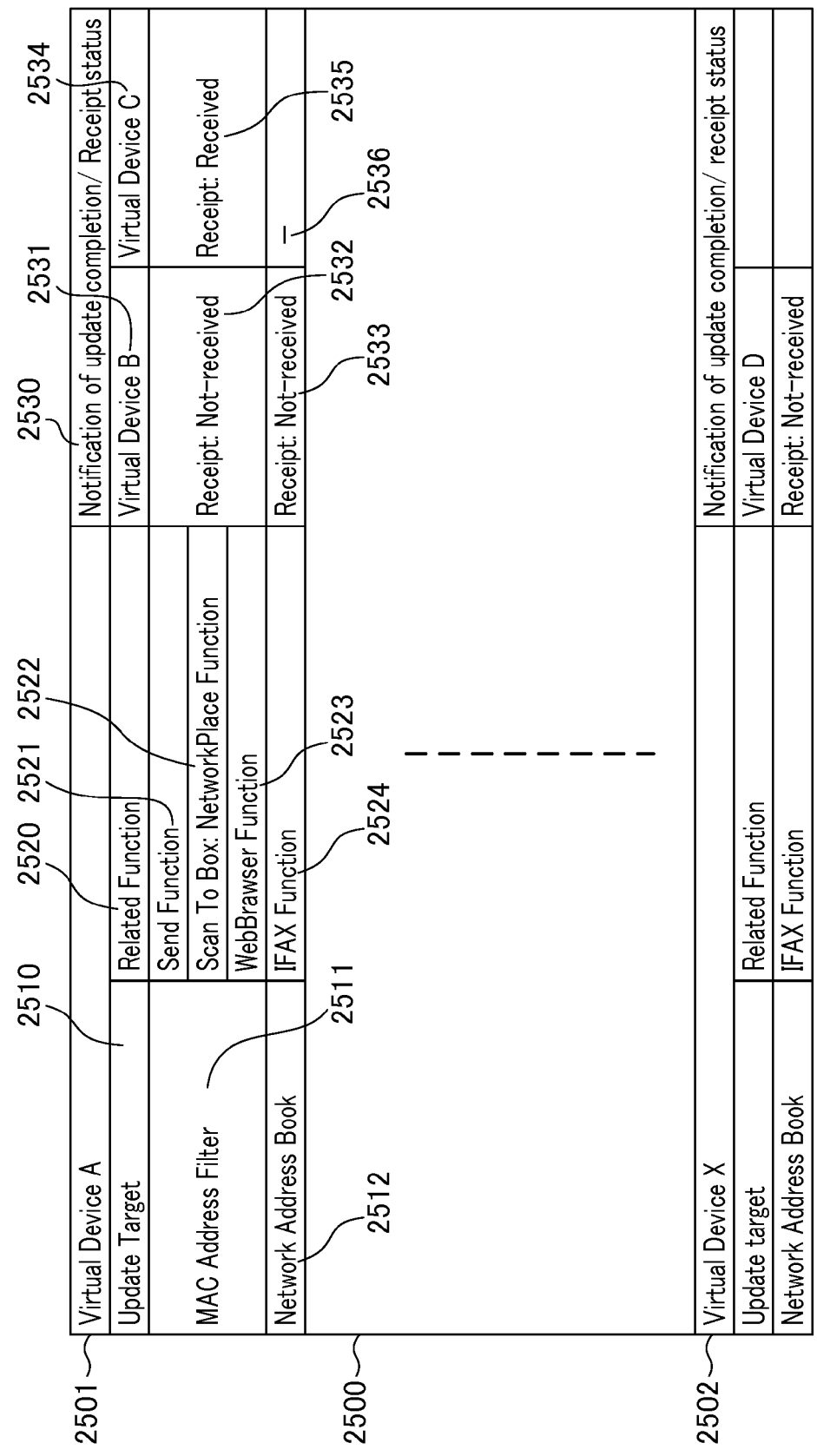
FIG. 14 is an example of an update table.

FIG. 14 is an example of the update table. The replace managing unit 330 manages the update table 2500. The update table 2500 includes at least the setting value of configuration data to be updated, functions relating to the update target, and correspondence information of the virtual device that needs to update.

A row 2501 of the update table 2500 indicates that data that is set following the row 2501 is data when the image forming apparatus corresponding to the virtual device A is replaced. Similarly, a row 2502 indicates that data that is set following the row 2502 is data when the image forming apparatus corresponding to the virtual device A is replaced.

A column 2510 indicates a update target, a column 2520 indicates a function relating to the update target, and a column 2530 indicates the virtual device registered as the update target and a reception status of an update completion notification from the registered virtual device.

A column 2511 indicates that the update target is the MAC filter. The functions relating to the MAC filter of target are a Send function (2521), a ScanToBox: a NetWorkPlace function (2522), and a WebBrowser function (2523). In this example, the image forming apparatus B (2532) and the virtual device C (2535) are registered as a device that needs updating of the MAC filter. Also, in this example, the update completion notification is not received from the image forming apparatus B but received from the virtual device C.

When the update target is the network address book, relational function is an IFAX function (2524), the image forming apparatus B (2533) is registered as the virtual device that needs updating. Also, in this example, an update completion notification is not received from the image forming apparatus B.

Figure 15:
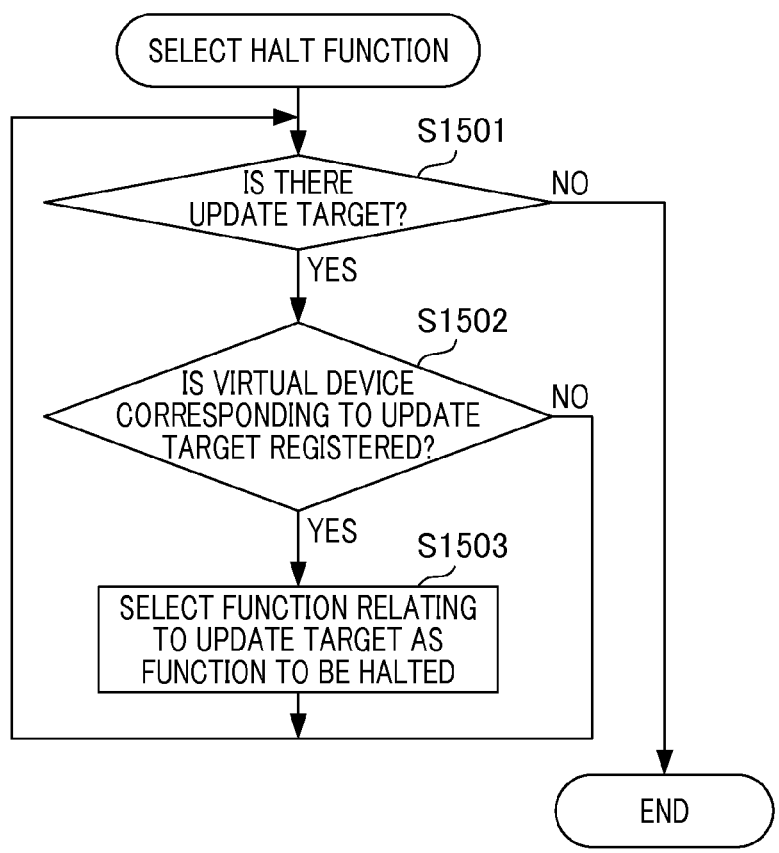
FIG. 15 is a flowchart illustrating halt function selection processing.

FIG. 15 is a flowchart illustrating a detail example of halt function selection processing in step S1203 shown in FIG. 12. Firstly, the replace managing unit 330 searches each update target in the update table in order to thereby determine whether or not an uninvestigated update target is present (step S1501). When no uninvestigated update target is present, the process ends. When the uninvestigated update target is present, the replace managing unit 330 selects the update target, the process advances to step S1502.

Next, the replace managing unit 330 determines whether or not the virtual device corresponding to the update target selected in the update table in step S1501 is registered (step S1502). When the virtual device corresponding to the update target selected in the update table in step S1501 is not registered, the process returns to step S1501. When the virtual device corresponding to the update target selected in the update table in step S1501 is registered, the process advances to step S1503. In step S1503, the replace managing unit 330 selects the function relating to the update target as a function to be halted (step S1503), the process returns to step S1501.

Figure 16:
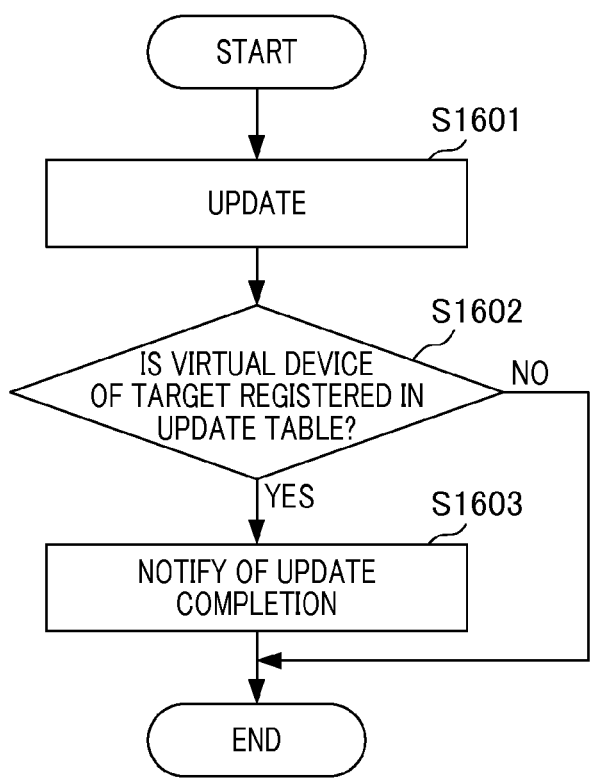
FIG. 16 is a flowchart illustrating an exemplary update processing of actual configuration data.

FIG. 16 is a flowchart illustrating an exemplary update processing of actual configuration data. Processing shown in FIG. 16 corresponds to processing 1131 and processing 1141 shown in FIG. 11. Firstly, as well as passing virtual configuration data to the image forming apparatus that is the actual device, the replace managing unit 330 requests the update of actual configuration data to thereby update the actual configuration data (step S1601). Subsequently, the replace managing unit 330 determines whether or not the virtual device to be updated in the update table is registered with reference to the update table (step S1602).

The virtual device to be updated is not registered in the update table, the process ends. The virtual device to be updated is registered in the update table, the process advances to step S1603. Then the replace managing unit 330 transmits the update completion notification to the virtual device after being replaced (step S1603). Processing in step S1603, for example, corresponds to the messages 1132 and 1142 shown in FIG. 11.

Figure 17:
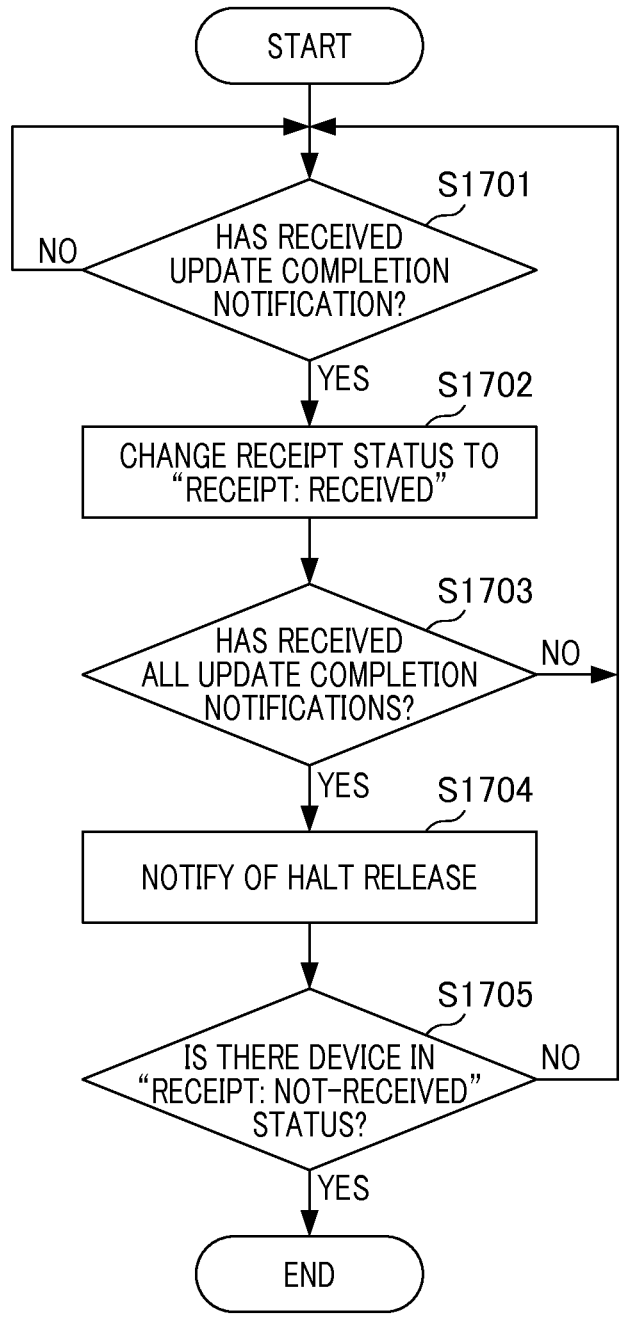
FIG. 17 is a diagram describing operation processing of the virtual device that received an update completion notification.

FIG. 17 is a flowchart describing operation processing by the virtual device that has received the update completion notification in step S1603 shown in FIG. 16. In fact, the replace managing unit 330 executes this processing. Firstly, the replace managing unit 330 determines whether or not to have received the update completion notification from the virtual device (step S1701). When the replace managing unit 330 does not receive the update completion notification, the process returns to step S1701. When the replace managing unit 330 receives the update completion notification, the process advances to step S1702.

Next, the replace managing unit 330 changes all reception statuses of the virtual devices to "reception: received" (step S1702). For example, the replace managing unit 330 sets "reception: received" in a list of the data item of the virtual device C such as the update table shown in FIG. 14 when it has received the update completion notification from the virtual device C.

Next, the replace managing unit 330 determines whether or not to have received the update completion notification from all of the virtual devices corresponding to the relational function of the update target (step S1703). For example, among the virtual devices relating to the Send function set in the update table shown in FIG. 14, "reception: received" is set in the list of the data item of the virtual device C. However, "reception: not-received" remains in the list of the data item of the virtual device B, thus the replace managing unit 330 determines the virtual device that has not updated configuration data is present.

"Reception: received" is set in the update table about all of the virtual devices registered in the relational function 2502, the process advances to step S1704. Among the virtual devices registered in the relational function 2502, the virtual device about which "reception: not-received" is set in the update table remains, the process returns to step S1701, In step S1704, the replace managing unit 330 notifies the image forming apparatus that is the actual device of a halt release about the relational function of which the updates of all corresponding virtual devices are completed. This notification corresponds to the message 1126 shown in FIG. 11. Subsequently, the replace managing unit 330 determines whether the virtual device with "reception: not-received" remains in the update table (step S1705). When the virtual device with "reception: not-received" remains in the update table, the process returns to step S1701. When the virtual device with "reception: not-received" does not remain in the update table, the process ends.

Figure 18:
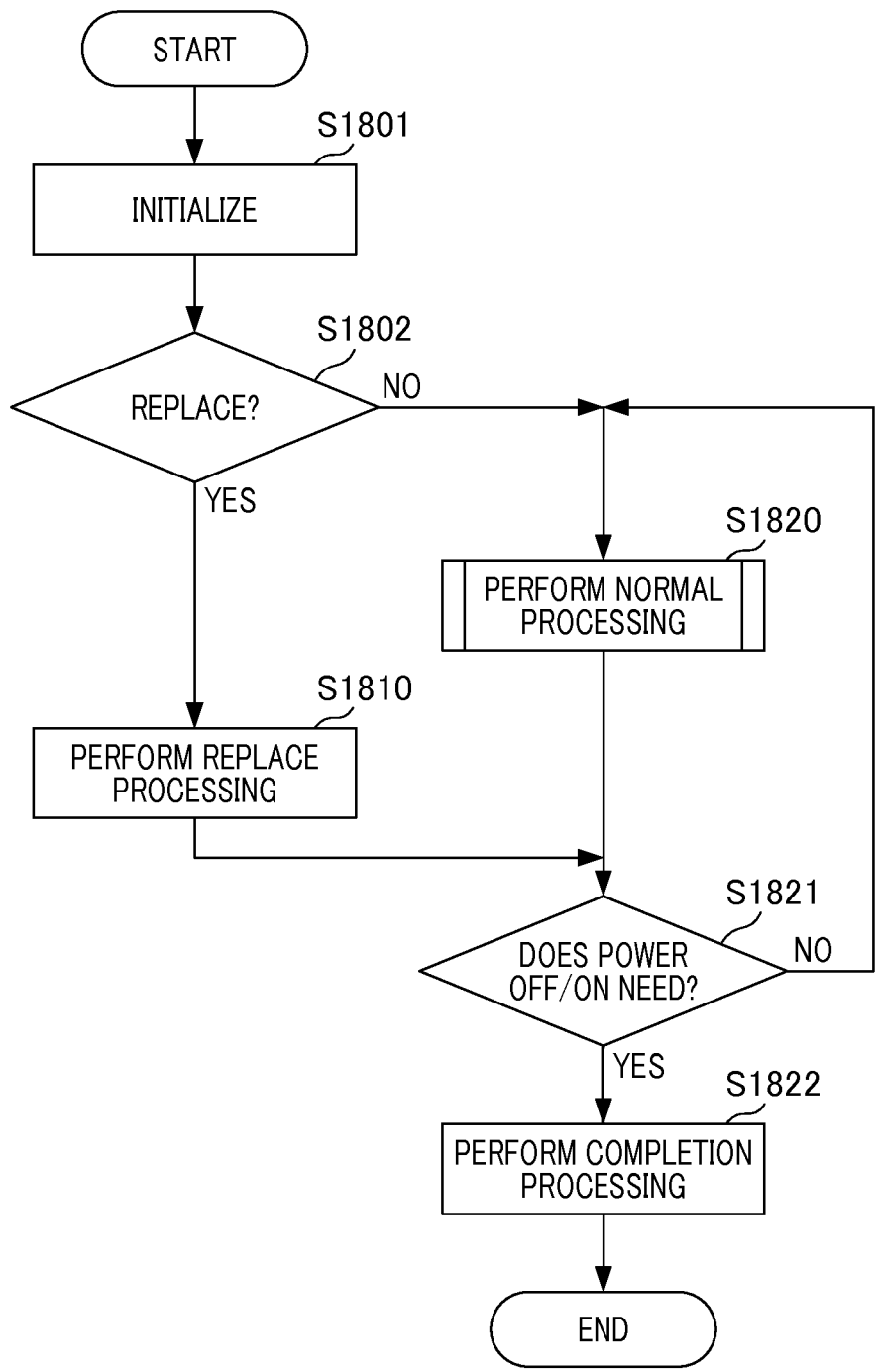
FIG. 18 is a flowchart describing an exemplary operation processing of the image forming apparatus.

FIG. 18 is a flowchart describing exemplary operation processing by the image forming apparatus. Firstly, initialization processing is executed when the power of the image forming apparatus 101 is ON (step S1801). Next, the image forming apparatus 101 (of the replacement executing unit 340) determines whether or not to start replace processing (step S1802). When the image forming apparatus 101 determines to start replace processing, the image forming apparatus 101 executes replace processing (step S1810), and the process advance to step S1821. When the image forming apparatus 101 determines not to start replace processing, the image forming apparatus 101 executes normal processing (step S1820), and the process advances to step S1821.

Next, the image forming apparatus 101 determines whether or not to need the power OFF/ON as post-processing (step S1821). When the image forming apparatus 101 determines not to need the power OFF/ON as post-processing, the process returns to step S1820. When the image forming apparatus 101 determines to need the power OFF/ON as post-processing, it executes termination processing (step S1822).

Figure 19:
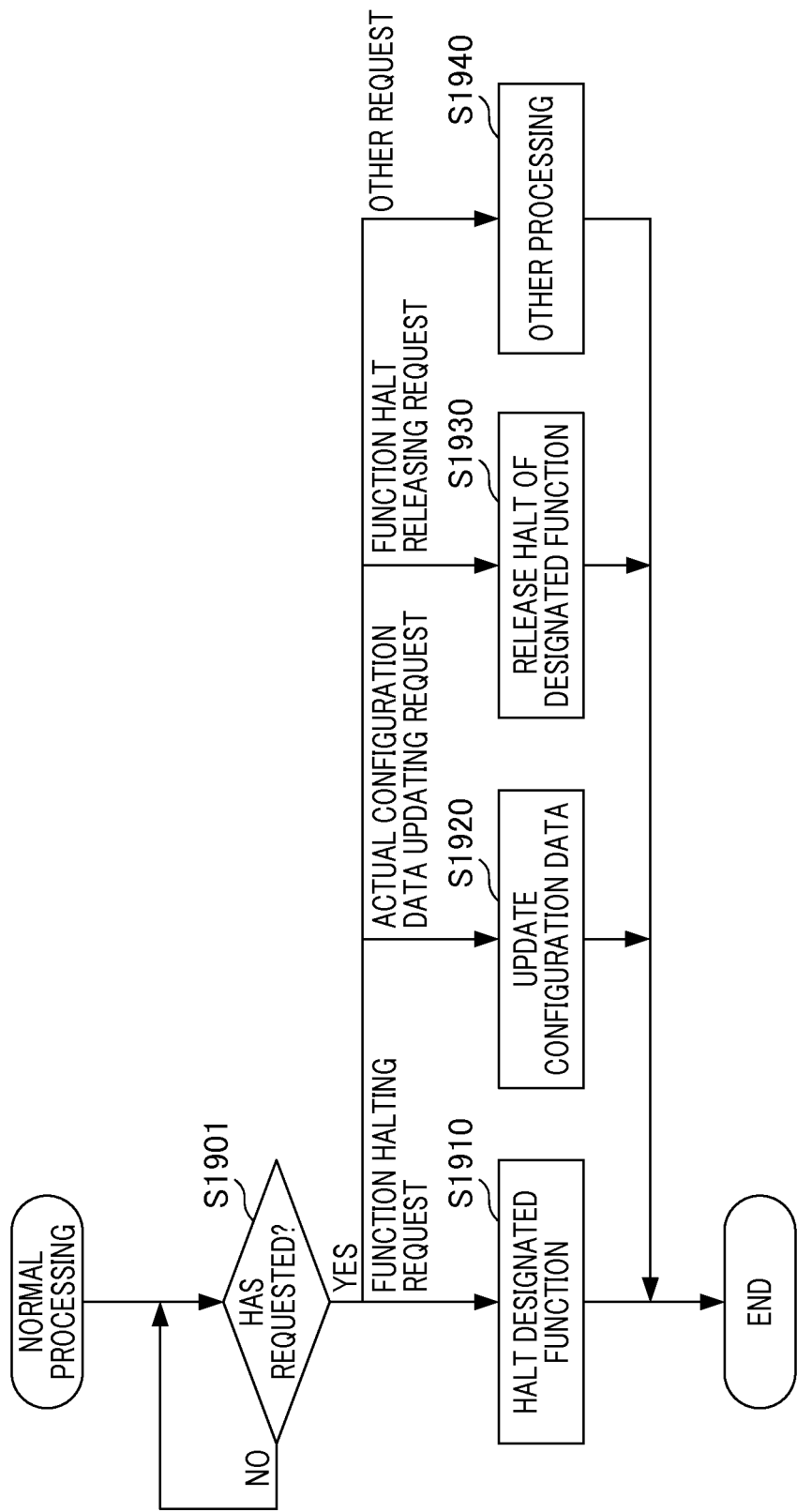
FIG. 19 is a flowchart illustrating normal processing.

FIG. 19 is a flowchart describing a detail example of normal processing in step S1820 shown in FIG. 18. Firstly, the image forming apparatus 101 determines whether or not to have received a request from the external device (step S1901). When the image forming apparatus 101 determines not to have received a request from the external device, the process returns to step S1901. When the image forming apparatus 101 determines to have received a request from the external device, the image forming apparatus 101 executes any one of following processing steps S1910 to S1940 according to the kind of the request. When the request is the function halting request, the replacement executing unit 340 of the image forming apparatus 101 halts the function designated by the function halting request (step S1910). This arrangement prevents processing of function relating to configuration data by the image forming apparatus 101 from being executed before update completion of configuration data of the other image forming apparatus that needs updating of configuration data as a result of replacement of the image forming apparatus 101.

Figure 20A:
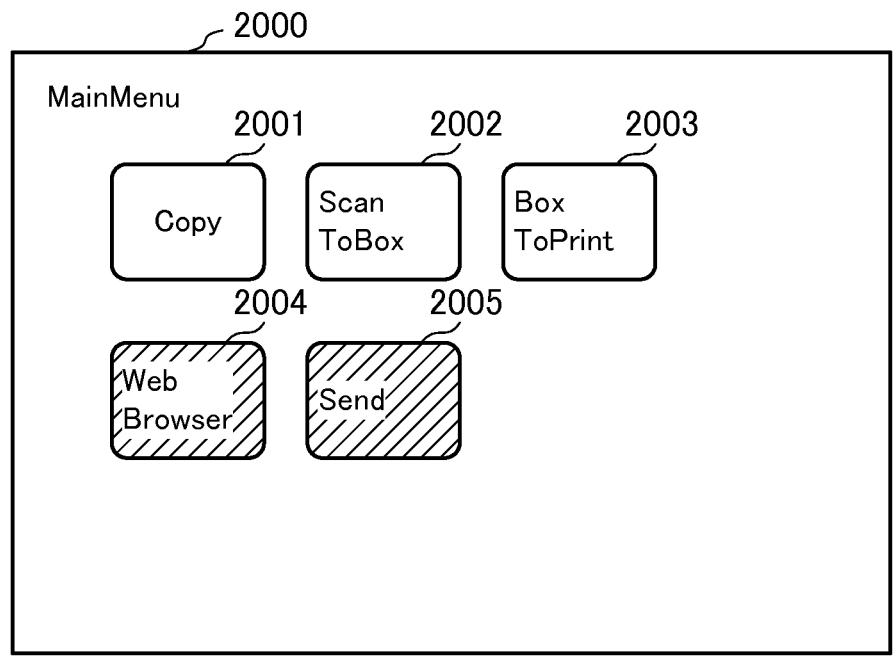
FIGS. 20A and 20B are examples of a screen displayed by the image forming apparatus that has halted its function.
Figure 20B:
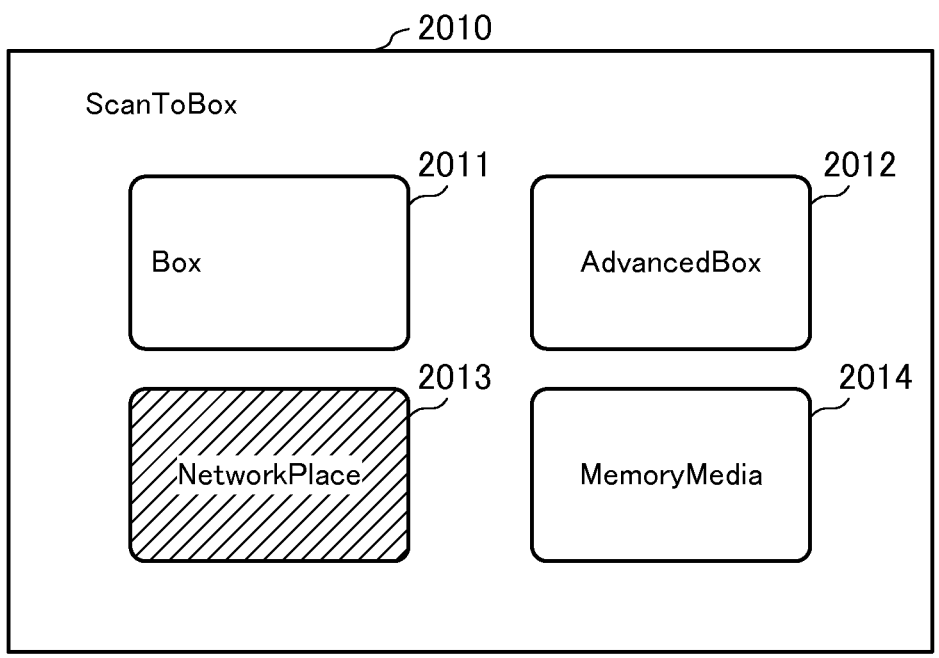

FIGS. 20A and 20B are examples of a screen which the image forming apparatus displays on the display 205A when the functions of the image forming apparatus are halted. A screen 2000 shown in FIG. 20A indicates a menu screen that displays each function of the image forming apparatus which a user selects and operate. In the exemplary menu screen shown in FIG. 20A, the functions corresponding to grayed out buttons 2004 and 2005 (seen in shaded in FIG. 20A) are halted. Specifically, the Web Browser function and the Send function are halted.

FIG. 20B indicates a basic screen of the ScanToSend function which the image forming apparatus displays when the user presses down a button 2002. In the example shown in FIG. 20B a button 2013 is grayed out. In other words, the NetWorkPlace function of the image forming apparatus is halted. When the MAC filter is the update target, the NetWorkPlace function is halted.

Returning to FIG. 19, when the request is the update request of actual configuration data, as well as receiving the update request of actual configuration data, the actual configuration data updating unit 302 of the image forming apparatus 101 updates actual configuration data based on the received virtual configuration data (step S1920).

When the request is the halted function releasing request, the replacement executing unit 340 of the image forming apparatus 101 releases the halted function designated by the halted function releasing request. This arrangement prevents processing of function relating to configuration data by the image forming apparatus 101 from being executed before update completion of configuration data of the other image forming apparatus that needs updating of configuration data as a result of replacement of the image forming apparatus 101. When the request is not any one of the function halting request, the update request of actual configuration data, or the halted function releasing request, the predetermined processing unit of the image forming apparatus 101 executes processing in response to the request (step S1940).

The set value management service 310 provided in the information processing system in the first embodiment described above searches the image forming apparatus that needs updating of configuration data among the image forming apparatuses which the set value management service 310 manages when the image forming apparatus is replaced. Then, the set value management service 310 updates configuration data of the searched image forming apparatus. Thus, according to the information processing system in the first embodiment, other image forming apparatus that needs updating of configuration data is searched, and configuration data of the searched the image forming apparatus is automatically changed without exceed processing load when the image forming apparatus is replaced.

In the first embodiment, it is assumed that the server computer group 105 realizes the set value management service 310. However, another structure may be employed. For example, one server computer realizes the set value management service 310. Also, the set value management service 310 may be realized in the user environment 100, the service person environment 110, the vender environment 120 of image forming apparatus, or the like.

In the first embodiment, it is assumed that the service person utilizes the terminal device 102B located in the service person environment 110. However, another structure may be employed. For example, a structure in which the service person utilizes terminal device 102A located in the user environment under permission of the user.

Also, the server computers 210A and 210B communicate with each other via the network 220 shown in FIG. 2. However another structure may be employed. For example, the server computers 210A and 210B communicate with each other via the Internet 104.

Also, the actual configuration data holding unit 301 stores actual configuration data in the auxiliary storage device 204A shown in FIG. 3. However another structure may be employed. For example, a structure in which the actual configuration data holding unit 301 temporally stores actual configuration data in the volatile memories 203A may be employed. In this case, since actual configuration data is lost when the power is OFF, the virtual configuration data receiving unit 303 needs to receive virtual configuration data every time the power of the device is ON. As a specific processing, update determination processing in step 1004 is omitted, processing in step 1007 shown in FIG. 10 is always performed.

The actual device configuration data collecting unit 304 shown in FIG. 3 collects actual device configuration data every time the power of the image forming apparatus is ON. However, another structure may be employed. For example, the image forming apparatus may include an actual device configuration data holding unit (not shown) for consistently storing actual device configuration data in the auxiliary storage device 204A. In this case, it is required for promptly rewriting device configuration data held by the actual device configuration data holding unit depending on the change of actual device configuration data. Thus, the actual device configuration data collecting unit 304 monitors the change of actual device configuration data, notifies the actual device configuration data holding unit of the changed content, and reflects the changed content on actual device configuration data when the actual device configuration data collecting unit 304 detects the changed contents. Also, the actual device configuration data notification unit 306 requests actual device configuration data to the actual device configuration data holding unit.

The tenant identifier holding unit 305 shown in FIG. 3 stores the tenant identifier in the tenant identifier auxiliary storage device 204A. However another structure may be employed. For example, a structure in which a user inputs the tenant identifier by using the input device 206A every time may be employed. The timing of the input may be upon activation of the image forming apparatus, or another timing may be available. In this case, the tenant identifier is stored in the volatile memories 203A.

The actual device configuration data notification unit 306 shown in FIG. 3 performs processing when the power of the image forming apparatus is ON. However, another structure may be employed. For example, a structure in which the user instructs acquisition of virtual configuration data by using the input device 206A may be employed. In this case, subsequent processing of step 1002 is performed when the image forming apparatus detects the acquisition instruction of virtual configuration data in step 1001 shown in FIG. 10.

The virtual device holding unit 311 shown in FIG. 3 holds the identifier as shown in FIG. 8 for identifying virtual device configuration data and virtual configuration data. However, another structure may be employed. For example, a structure in which the virtual device holding unit 311 holds substance of data other than the identifier may be employed.

The virtual configuration data generating unit 316 shown in FIG. 3 generates virtual configuration data based on the model setting value schema, tenant configuration data, and virtual device configuration data. However, another structure may be employed. For example, the virtual configuration data generating unit 316 generates virtual configuration data depending on the model based on the model setting value schema and tenant configuration data. In this case, the image forming apparatus refers to actual configuration data depending on device configuration when referring to actual configuration data. Also, a structure in which the virtual configuration data generating unit 316 generates virtual configuration data with additional predetermined license data may be employed. In this case, virtual configuration data accommodated with optional functions provided in the image forming apparatus is generated.

(Second Embodiment)

FIG. 13B is a flowchart describing a detail example in processing 1201 shown in FIG. 12 in a second embodiment. Hereinafter a description will be given of update processing of configuration data executed by the information processing system in the second embodiment with reference to FIG. 13B.

Firstly, the replace managing unit 330 searches the image forming apparatus having a network address book that holds information of the image forming apparatus to be replaced as configuration data (step S1401). Specifically, the replace managing unit 330 searches virtual configuration data having the network address book to thereby find out the virtual device that needs updating.

Next, the replace managing unit 330 determines whether or not the virtual device that needs updating is present (step S1402). When no virtual device that needs updating is present, the process ends. The virtual device that needs updating is present, the process advances to step S1403.

Next, the replace managing unit 330 updates the network address book of virtual configuration data retained by the virtual device that needs updating (step S1403). Specifically, the replace managing unit 330 changes the information of the image forming apparatus to be replaced retained by the network address book before being replaced to the information of the image forming apparatus after being replaced. Subsequently, the replace managing unit 330 registers the virtual device to be updated in row of the network address book in the update table (step S1404), the process returns to step S1402.

Figure 21:
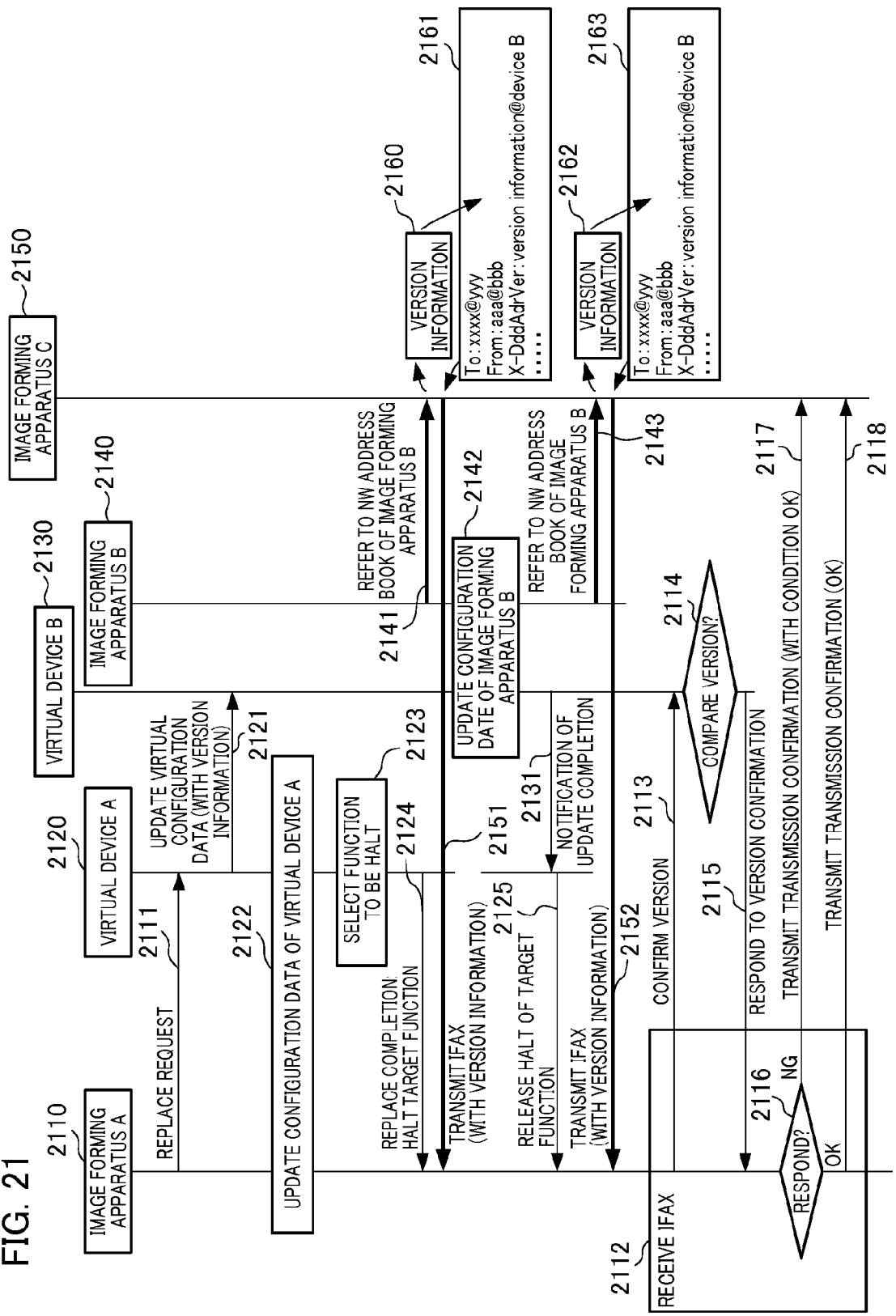
FIG. 21 is a sequence diagram describing an exemplary operation processing of the information processing system.

FIG. 21 is a sequence diagram describing an exemplary operation processing by the information processing system in the second embodiment. In second embodiment, the network address book held by other image forming apparatus is updated when the image forming apparatus is replaced. The network address book is an address book of which other image forming apparatus is capable of referring to the address book held by any image forming apparatus via the network. For example, the image forming apparatus having the IFAX function performs transmission setting based on capability information (i.e., resolution) of transmission destination. Thus, the network address book needs updating when the image forming apparatus of transmission destination is replaced. Note that the updating of the network address book is taken to describe in this example, the setting that needs updating is not limited to the network address book among the settings of configuration data retained by other image forming apparatus when the image forming apparatus is replaced.

FIG. 21 is a basic sequence diagram in the second embodiment. Reference numbers 2110, 2140, and 2150 indicate the image forming apparatus A, B, and C, respectively. Reference numbers 2120 and 2130 indicate the virtual device A and B, respectively. The virtual device A corresponds to the image forming apparatus A. The image forming apparatus B corresponds to the image forming apparatus B.

In this example, it is assumed that the image forming apparatus A is replaced and the network address book set in configuration data of the image forming apparatus B needs a change. Also, it is assumed that version information is associated with the network address book. Firstly, the image forming apparatus A transmits a message 2111 as the replace request to the virtual device A upon replace. The virtual device A receives the message 2111 and searches the virtual device that needs updating of virtual configuration data. Specifically, among virtual configuration data, the virtual device searching unit 331 searches the virtual device having virtual configuration data including the network address book that registers the image forming apparatus A that is a request source as a transmission destination of information.

When the image forming apparatus B is found out as a search result, the virtual device A updates virtual configuration data corresponding to the virtual device B by notifying the update message to the virtual device B (processing 2121). Specifically, the virtual configuration data changing unit 332 changes the information of the image forming apparatus A held by the network address book set in virtual configuration data corresponding to the virtual device B to the information of the image forming apparatus A after being replaced. Also, the virtual configuration data changing unit 332 updates the version information of the network address book.

Next, the virtual configuration data changing unit 332 updates configuration data held by the virtual device A (processing 2122). Also, the halt function selecting unit 333 selects the function to be halted until the setting of other image forming apparatus is completed if necessary with reference to the update table (processing 2123). In this example, the halt function selecting unit 333 selects the IFAX function relating to the network address book from the update table shown in FIG. 14. Then, the halt function selecting unit 333 notifies the image forming apparatus A of a message 2124 that instructs to halt the selected function until the setting of other image forming apparatus is completed. The image forming apparatus A that has been notified of the message 2124 halts the function of target.

The image forming apparatus B acquires updated configuration data updates corresponding to the image forming apparatus B and updates actual configuration data (processing 2142). The image forming apparatus B notifies the virtual device A of the update completion (a message 2131) when it finishes updating of corresponding actual configuration data. The virtual device A that received the update completion notification requests for release of the halted function. Specifically, the halt function selecting unit 333 notifies the image forming apparatus A of the message 2125 that instructs to release the halted function by the message 2124 when it determines that all of actual configuration data to be updated has been updated.

Here, there is a period in which the network address book corresponding to the image forming apparatus B is old even if configuration data of the image forming apparatus A has been replaced. Specifically, in a period until processing 2142 is completed after the virtual device A transmitted the message 2124, the version information of the network address book corresponding to the image forming apparatus B is the version information before being updated.

In this example, the image forming apparatus C transmits IFAX data to the image forming apparatus A with reference to the network address book of the image forming apparatus B. At this time, the version information of the network address book retained by the image forming apparatus B, that acquired by the image forming apparatus C by referring to the message 2141, is the version information before being updated.

The image forming apparatus C creates IFAX data by referring to the information of the image forming apparatus A retained by the network address book such as a manner described below. The image forming apparatus C acquires the version information (2160) of the referred network address book from the message 2141. The image forming apparatus C adds the acquired version information to the header of a mail (2161) to thereby generate IFAX data, and transmits it to the image forming apparatus A (processing 2151). In an example of the mail 2163, X-dddAdrVersion is the version information.

In other words, the image forming apparatus C functions as a third image forming apparatus that executes following processing. The image forming apparatus C refers to configuration data of the second image forming apparatus (the image forming apparatus B). The image forming apparatus C generates information corresponding to the referred configuration data, that is, the transmission information including the version information of configuration data, and transmits the generated transmission information to the first image forming apparatus (the image forming apparatus A) via the network. In this example, the image forming apparatus A includes a reception unit that receives IFAX data from the image forming apparatus C.

Since the image forming apparatus A halts the IFAX function, and has not received the IFAX data yet at this time. Here, it is assumed that the image forming apparatus C refers to the network address book (the message 2143) after processing 2142, and transmits IFAX data to the image forming apparatus A similar to the message 2151 (processing 2152). The information of the referred network address book is updated to the information of the image forming apparatus A after being replaced.

The image forming apparatus A that has received the message 2125 activates the IFAX function. At this time, the image forming apparatus A receives two IFAX data including the message 2151 and the message 2152 (processing 2112). Therefore, the image forming apparatus A verifies whether or not the version information described in the header of the mail corresponding to the IFAX data transmitted in processing 2151 or 2152 is the newest upon receiving IFAX.

Specifically, the version managing unit 341 of the image forming apparatus A requests the virtual device B to compare the version information (a message 2113). In other words, the version managing unit 341 functions as a comparison requesting unit that executes following processing with respect to the set value management service 310. The version managing unit 341 requests comparison processing of the version information of configuration data of the image forming apparatus B included in the received IFAX data with the version information of configuration data of the image forming apparatus B held by the virtual device holding unit 311.

The virtual device B compares the version information transmitted from the image forming apparatus A with the version information of the network address book held by the virtual device B (processing 2114). Specifically, the version comparing unit 334 of the set value management service 310 executes processing 2114. Then, the virtual device B passes an execution result of comparison processing for the version information (the message 2115).

In this example, it is assumed that the version information described in the header of the mail corresponding to the IFAX data transmitted in processing 2151 matches the version information of the network address book retained by the virtual device B. Also, it is assumed that the version information described in the header of the mail corresponding to the IFAX data transmitted in processing 2152 does not match the version information of the network address book held by the virtual device B.

The version managing unit 341 of the image forming apparatus A functions as a determining unit that executes following processing. The version managing unit 341 receives the execution result of the comparison processing response indicated by the message 2115. Then, the version managing unit 341 determines whether or not the version information described in the header of the mail corresponding to the IFAX data matches the version information of the network address book held by the virtual device B based on the execution result of comparison processing.

When version information described in the header of the mail corresponding to the IFAX data matches the version information of the network address book retained by the virtual device B, the version managing unit 341 of the image forming apparatus A executes following processing. The version managing unit 341 determines that the IFAX data has been generated based on the newest configuration data. Then, the version managing unit 341 transmits a transmission confirmation (OK) to the image forming apparatus C. The transmission confirmation (OK) is a message indicating the IFAX data is generated based on the newest configuration data. When the version information described in the header of the mail corresponding to the IFAX data does not match the version information of the network address book held by the virtual device B, the image forming apparatus A transmits a transmission confirmation (with condition OK) to the image forming apparatus C. The transmission confirmation (with condition OK) is a message indicating that it is confirmed that the transmitted IFAX data has been generated based on the address book of old version information.

Figure 22:
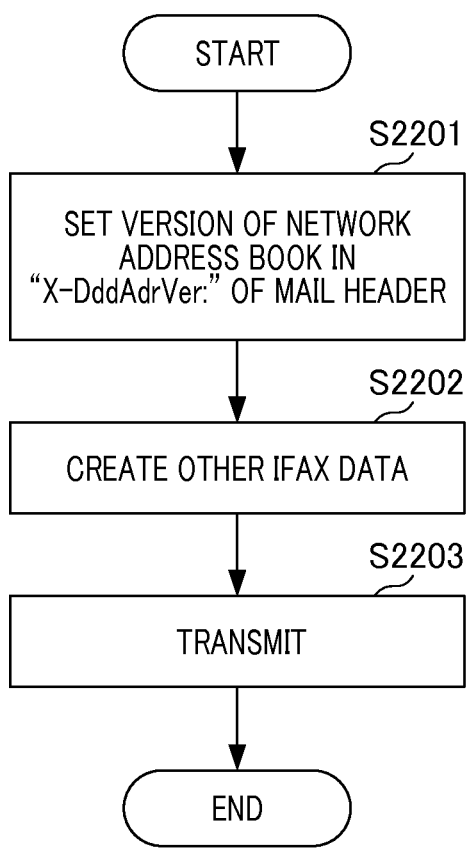
FIG. 22 is a diagram describing an example of IFAX transmission processing executed by the image forming apparatus.

FIG. 22 is a flowchart describing an exemplary IFAX transmission processing executed by the image forming apparatus. In FIG. 22, a description will be given by taking IFAX transmission processing as an example executed by the image forming apparatus C shown in FIG. 21. Firstly, the image forming apparatus C refers to the network address book of the image forming apparatus B shown in FIG. 21, and set the version of the network address book to X-dddAdrVer of the mail header (2161) shown in FIG. 21 (step S2201).

Next, the image forming apparatus C creates other IFAX data (step S2202). Subsequently, the image forming apparatus C transmits the IFAX data to the image forming apparatus A (step S2203), the process ends.

Note that the image forming apparatus C may set any information that allows the image forming apparatus A to specify the referred information in the mail header instead of the version of the network address book in step S2202. For example, the image forming apparatus C may set the version information of configuration data in the mail header if the version of configuration data of the image forming apparatus is upgraded in addition to the network address book.

FIG. 23 is a flowchart describing an exemplary IFAX reception processing executed by the image forming apparatus. In FIG. 22, a description will be given by taking an example of IFAX reception processing executed by the image forming apparatus A shown in FIG. 21. Firstly, the image forming apparatus A receives IFAX data from the image forming apparatus C (step S2301).

Next, the image forming apparatus A prints or saves the received IFAX data (step S2302). Subsequently, the image forming apparatus A requests the virtual device B to compare the version information. Then, the image forming apparatus A executes following determination processing based on the received comparison result of the version information as a response (step S2303).

The image forming apparatus A determines whether or not the version set in the mail header corresponding to the IFAX data received in step S2301 matches the version of the network address book of the image forming apparatus. When the image forming apparatus A determines that the version matches, the image forming apparatus A transmits the transmission confirmation (OK) to the image forming apparatus C. When the image forming apparatus A determines that the version does not match, the image forming apparatus A transmits the transmission confirmation (with condition OK) to the image forming apparatus C.

FIGS. 24A to 24C are examples of an operation panel of the image forming apparatus that transmits IFAX data. As shown in FIGS. 24A to 24, a description will be given by taking an example of the operation panel of the image forming apparatus C. FIG. 24A illustrates an example of an IFAX transmission history screen displayed by the image forming apparatus C. The IFAX transmission history screen is a screen that displays the transmission history transmitted by the image forming apparatus C. A history 2411 means transmission OK, a history 2412 means transmission with condition OK, and a history 2413 means transmission NG. The transmission OK and the transmission with condition is decided based on the transmission confirmation (messages 2114 and 2115) by the receiving site.

FIG. 24B indicates an exemplary screen of an IFAX transmission detail history. The IFAX transmission detail screen is a screen that displays transmission history detail information of IFAX data. When the user selects the history 2411 and presses down a button 2418 shown in FIG. 24A, the history 2411 is displayed on the IFAX transmission detail history screen. A message indicating of normal reception is displayed on the IFAX transmission detail history screen.

FIG. 24C illustrates other example of the IFAX transmission detail history screen. When the user selects the history 2412 and presses down the button 2418 shown in FIG. 24A, detail information of the history 2412 is displayed on the IFAX transmission detail history screen. The image forming apparatus displays that the old address book is used is displayed on the IFAX transmission detail history screen shown in FIG. 24B and notifies of a possibility that information has been transmitted in a condition without exactly understanding the capability of the other device (the image forming apparatus A).

According to the information processing system of the second embodiment, when third image forming apparatus generates transmission information for the first image forming apparatus based on configuration data of the second image forming apparatus that needs updating accompanied with replacement of the first image forming apparatus, following advantageous is obtained. The first image forming apparatus can determine whether or not the transmission information is correct based on the comparison result of the version of configuration data included in the transmission information and the version of configuration data of the second image forming apparatus retained in the set value management service 310.

Aspects of the present invention can also be realized by a computer of a system or apparatus (or devices such as a CPU or MPU) that reads out and executes a program recorded on a memory device to perform the functions of the above-descried embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-271020 filed Dec. 12, 2011, which is hereby incorporated by reference herein in its entirety.

What is claimed is:

1. An information processing system comprising:
an image forming apparatus; and
a management device that manages operation setting information for switching an operation of the image forming apparatus, wherein the management device comprises:
 a holding unit configured to hold the operation setting information of the image forming apparatus;
 a request receiving unit configured to receive a replace request for replacing operation setting information of a first image forming apparatus from the first image forming apparatus that has been replaced;
 a searching unit configured to search a second image forming apparatus that needs to update operation setting information as a result of replacement of the first image forming apparatus when the replace request is received; and
 an updating unit configured to update the operation setting information of the searched second image forming apparatus, and
wherein the first image forming apparatus comprises:
 a replace requesting unit configured to transmit the replace request for replacing own operation setting information via the network when the first image forming apparatus is replaced.

2. The information processing system according to claim 1, wherein the management device further comprises:
a selecting unit configured to select one or more functions which the first image forming apparatus halts until the updating unit completes the updating of the operation setting information of the second image forming apparatus among functions included in the first image forming apparatus;
a halt instructing unit configured to instruct the first image forming apparatus to halt the selected one or more functions via the network;
a resumption instructing unit configured to instruct the first image forming apparatus that has halted the one or more functions instructed by the halt instructing unit to resume the halted one or more functions via the network when the updating unit completes the updating of the operation setting information of the second image forming apparatus,
wherein the first image forming apparatus further comprises:
a halting unit configured to halt the one or more functions instructed by the halt instructing unit of the management device; and
a resuming unit configured to resume the halted one or more functions instructed by the resume instructing unit of the management device.

3. The information processing system according to claim 1,
wherein the operation setting information held by the holding unit of the management device includes version information indicating a version of the operation setting information,
wherein a third image forming apparatus refers to the operation setting information of the second image forming apparatus held by the holding unit, generates transmission information corresponding the referred operation setting information and including the version information of the referred operation setting information, and transmits the generated transmission information to the first image forming apparatus via the network, and
wherein the first image forming apparatus comprises:
a receiving unit configured to receive the transmission information from the third image forming apparatus;
a comparison requesting unit configured to request the management device to compare the version information included in the operation setting information of the second image forming apparatus included in the received transmission information with the version information included in the operation setting information of the second image forming apparatus held by the holding unit;
a determining unit configured to receive a comparison result from the management device, and determining that the transmission information has been generated based on updated operation setting when the received comparison result indicates that the version information included in the operation setting information of the second image forming apparatus included in the received transmission information matches the version information included in the operation setting information of the second image forming apparatus held by the holding unit.

4. The information processing system according to claim 1,
wherein the replace request received by the request receiving unit of the management device includes a MAC address of the first image forming apparatus after being replaced, and
wherein the searching unit searches the image forming apparatus corresponding to the operation setting information in which a MAC address filter that registers the MAC address is set as the second image forming apparatus among the operation setting information held by the holding unit.

5. The information processing system according to claim 1,
wherein the searching unit searches the image forming apparatus corresponding to the operation setting information that includes a network address book that registers as a transmission destination the first image forming apparatus that is a request source of the replace request received by the receiving unit as the second image forming apparatus among the operation setting information held by the holding unit.

6. A management method in an information processing system comprising an image forming apparatus, and a management device that manages operation setting information for switching an operation of the image forming apparatus, the method comprising:
transmitting, by a first image forming apparatus, a replace request for replacing operation setting information of a first image forming apparatus when the first image forming apparatus is replaced;
receiving, by the management device, the replace require from the first image forming apparatus;
searching, by the management device, the second image forming apparatus that needs to update the operation setting information held by management device as a result of replacement of the first image forming apparatus; and
updating, by the management device, the operation setting information of the searched the second image forming apparatus.

7. A non-transitory storage medium on which is stored a computer program for making a computer execute a management method of an information processing system comprising an image forming apparatus and a management device that manages operation setting information for switching an operation of the image forming apparatus, the method comprising:
transmitting, by a first image forming apparatus, a replace request for replacing operation setting information of a first image forming apparatus when the first image forming apparatus is replaced;
receiving, by the management device, the replace require from the first image forming apparatus;
searching, by the management device, the second image forming apparatus needs to update the operation setting information held by management device as a result of replacement of the first image forming apparatus; and
updating, by the management device, the operation setting information of the searched the second image forming apparatus.

* * * * *